US012665416B2

(12) United States Patent  
Abe et al.

(10) Patent No.: US 12,665,416 B2  
(45) Date of Patent: Jun. 23, 2026

(54) POWER SYSTEM, CONTROLLER AND CONTROL METHOD

(71) Applicant: FURUKAWA ELECTRIC CO., LTD., Tokyo (JP)

(72) Inventors: Asuka Abe, Tokyo (JP); Sumio Kachi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 19/262,723

(22) Filed: Jul. 8, 2025

(65) Prior Publication Data

US 2025/0337238 A1     Oct. 30, 2025

Related U.S. Application Data

(63) Continuation of application No. PCT/JP2023/046247, filed on Dec. 22, 2023.

(30) Foreign Application Priority Data

Jan. 10, 2023     (JP) ................................. 2023-001477

(51) Int. Cl.  
*H02J 1/00*          (2006.01)
(52) U.S. Cl.  
CPC ...................................... *H02J 1/00* (2013.01)
(58) Field of Classification Search  
CPC ........................................................ H02J 1/00  
See application file for complete search history.

(56) References Cited

U.S. PATENT DOCUMENTS

| | | | |
|---|---|---|---|
| 2020/0280183 A1 | 9/2020 | Yamashita et al. | |
| 2022/0320992 A1* | 10/2022 | Ayai ....................... | H02J 7/0013 |
| 2023/0031139 A1* | 2/2023 | Dong ........................ | H02J 3/32 |

FOREIGN PATENT DOCUMENTS

| | | |
|---|---|---|
| CN | 101291113 A | 10/2008 |
| CN | 111628491 A | 9/2020 |

(Continued)

OTHER PUBLICATIONS

Japanese Office Action issued May 15, 2025, in Japanese Patent Application No. 2024-570128, therein, 4 pages (with English Translation).

(Continued)

*Primary Examiner* — Gary Collins  
(74) *Attorney, Agent, or Firm* — Oblon, McClelland, Maier & Neustadt, L.L.P.

(57)          ABSTRACT

A power system includes: power converters configured to acquire an electrical characteristic value of input power or power to output, control a power conversion characteristic of an output of power based on a reference function in which an electrical characteristic value of an output of power is defined according to an input value by using the acquired electrical characteristic value as an input value, and update a stored reference function to the acquired reference function; a controller configured to set a reference function and output the set reference function to the power converters; and a DC electric line to which the plurality of power converters is connected. The controller is configured to calculate a voltage drop in the electric line from a power target value of an output and a line impedance of the electric line, and set the reference function based on the calculated voltage drop.

8 Claims, 18 Drawing Sheets

(56) References Cited

FOREIGN PATENT DOCUMENTS

| JP | 2022-72385 | 5/2022 |
| WO | WO 2019/103059 A1 | 5/2019 |

OTHER PUBLICATIONS

Office Action mailed Mar. 21, 2026, in Chinese Application No. 202380085236.7 filed Dec. 22, 2023 (w/English Translation).

Extended European Search Report dated May 12, 2026, in European Application No. 23916262.1.

Fulong Li et al: "Comprehensive local control design for eliminating line resistance effect on power sharing degradation in DC microgrids", IET Power Electronics IET, UK, vol. 15, No. 1, Nov. 15, 2021 (Nov. 15, 2021), pp. 11-22, XP006113953, ISSN: 1755-4553, DOI: 10.1049/PEL2.12208.

Shebani Muamer M. et al: "An Implementation of Cable Resistance in Modified Droop Control Method for Parallel-connected DC-DC Boost Converters", 2018 IEEE Electrical Power and Energy Conference (EPEC) IEEE, Oct. 10, 2018 (Oct. 10,2018), pp. 1-6, XP033488914, DOI: 10.1109/EPEC.2018.8598363.

* cited by examiner

POWER SYSTEM, CONTROLLER AND CONTROL METHOD

This application is a continuation of International Application No. PCT/JP2023/046247, filed on Dec. 22, 2023 which claims the benefit of priority of the prior Japanese Patent Application No. 2023-001477, filed on Jan. 10, 2023, the entire contents of which are incorporated herein by reference.

BACKGROUND

The present disclosure relates to a power system, a controller and a control method.

As an alternative to a large-scale electric power network dependent on fossil energy and nuclear energy, an electric power network using power of local production for local consumption has attracted attention. A wide variety of devices such as a photovoltaic (PV) power generation device that is a power generation device that generates power using renewable energy, a stationary electrical storage device, and an electric vehicle (EV) are connected to the electric power network using the power of local production for local consumption. Since each of the above devices is a direct current (DC) power supply, studies have been made to construct an electric power network (DC grid) by DC.

For example, in the system disclosed in WO 2019/103059 A, a reference function based on the local power (P) and the local voltage (V) is applied to each power converter, and the DC grid is controlled in an autonomously dispersion manner. When a reference function having a drooping characteristic, that is, having a droop characteristic is used for the target voltage value according to the amount of power required for the DC bus, the control may be referred to as droop control. By performing the droop control on each power converter in an autonomously dispersion manner, it is possible to stabilize the voltage of the DC bus while performing load sharing of the power interchange of each device according to the amount of power required for the DC bus.

SUMMARY

In a case where autonomous dispersion control is performed in each power converter, in an ideal DC grid that does not consider a line length of a DC bus, voltage levels on the DC bus side are equal in respective power converters, and thus, it is possible to accurately grasp power to be exchanged and to interchange target power between the power supply side and the demand side. However, since an actual DC grid has a line length, voltage levels of the power supply side power converter and the power demand side power converter are different due to voltage drop due to resistance of the line. In the autonomous dispersion control, each power converter measures its own voltage level on the DC bus side and determines the power interchange. Therefore, when the voltage level is different between the power supply side and the demand side, it is difficult to interchange the power intended by the reference function.

There is a need for performing power interchange of a target power value even when a voltage drop occurs between a power supply side and a demand side.

According to one aspect of the present disclosure, there is provided a power system including: a plurality of power converters each including a power conversion unit configured to convert input power and output the converted power, a measurement unit configured to acquire an electrical characteristic value of the input power or the output power, a storage unit configured to store a reference function in which an electrical characteristic value of an output of the power conversion unit is defined according to an input value, a characteristic control unit configured to control a power conversion characteristic of the output of the power conversion unit based on the reference function by using the electrical characteristic value acquired by the measurement unit as the input value, and an update unit configured to acquire a reference function and update the reference function stored in the storage unit to the acquired reference function; a controller including a reference function setting unit configured to set the reference function of each of the plurality of power converters, and an output unit configured to output the set reference function to the plurality of power converters; and a DC electric line to which the plurality of power converters are connected, wherein the reference function setting unit is configured to calculate, for each of the plurality of power converters, a voltage drop in the electric line from a power target value of the output of the power conversion unit and a line impedance of the electric line, calculate a voltage target value of a local voltage of the power converter when the power target value is output within an operating voltage range of the power converter based on the calculated voltage drop, and set the reference function to a reference function in which an electrical characteristic value of the output of the power conversion unit when a local voltage is the voltage target value is defined as the power target value.

According to another aspect of the present disclosure, there is provided a controller including: a reference function setting unit configured to set a reference function of each of a plurality of power converters, the plurality of power converters each including a power conversion unit configured to convert input power and output the converted power, a measurement unit configured to acquire an electrical characteristic value of the input power or the output power, a storage unit configured to store a reference function in which an electrical characteristic value of an output of the power conversion unit is defined according to an input value, a characteristic control unit configured to control a power conversion characteristic of the output of the power conversion unit based on the reference function by using the electrical characteristic value acquired by the measurement unit as the input value, and an update unit configured to acquire a reference function and update the reference function stored in the storage unit to the acquired reference function; and an output unit configured to output the set reference function to the plurality of power converters, wherein the reference function setting unit is configured to calculate, for each of the plurality of power converters, a voltage drop in the electric line from a power target value of the output of the power conversion unit and a line impedance of a DC electric line to which the plurality of power converters is connected, calculate, based on the calculated voltage drop, a voltage target value of a local voltage of the power converter when the power target value is output within an operating voltage range of the power converter, and set the reference function to a reference function in which an electrical characteristic value of the output of the power conversion unit when a local voltage is the voltage target value is defined as the power target value.

According to still another aspect of the present disclosure, there is provided a control method including: a reference function setting step of setting a reference function of each of a plurality of power converters, the plurality of power converters each including a power conversion unit configured to convert input power and output the converted power, a measurement unit configured to acquire an electrical characteristic value of the input power or the output power, a storage unit configured to store a reference function in which an electrical characteristic value of an output of the power conversion unit is defined according to an input value, a characteristic control unit configured to control a power conversion characteristic of the output of the power conversion unit based on the reference function by using the electrical characteristic value acquired by the measurement unit as the input value, and an update unit configured to acquire a reference function and update the reference function stored in the storage unit to the acquired reference function; and an output step of outputting a set reference function to the plurality of power converters, wherein the reference function setting step includes calculating, for each of the plurality of power converters, a voltage drop in the electric line from a power target value of the output of the power conversion unit and a line impedance of a DC electric line to which the plurality of power converters is connected, calculating, based on the calculated voltage drop, a voltage target value of a local voltage of the power converter when the power target value is output within an operating voltage range of the power converter, and setting the reference function to a reference function in which an electrical characteristic value of the output of the power conversion unit when a local voltage is the voltage target value is defined as the power target value.

BRIEF DESCRIPTION OF THE DRAWINGS

FIG. 9 is a diagram illustrating an example of a relationship between power supply and demand;

FIG. 10 is a flowchart illustrating a flow of a process performed by a control unit of the power converter;

FIG. 14 is a diagram illustrating a power element and a power converter included in the third example;

DETAILED DESCRIPTION

Figure 1:
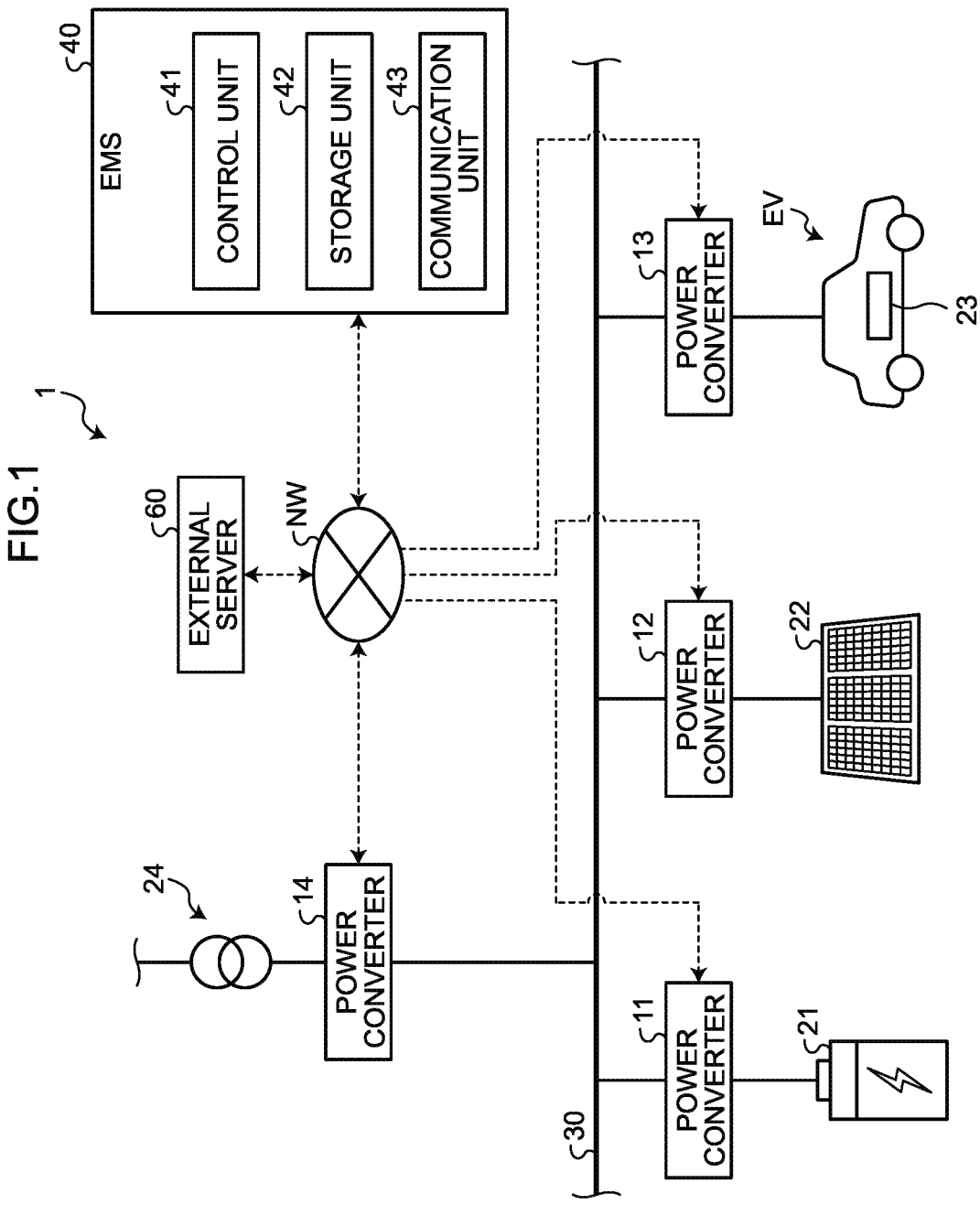
FIG. 1 is a diagram illustrating a configuration of a power system according to the embodiment.

Hereinafter, embodiments will be described with reference to the drawings. The present disclosure is not limited to the embodiments described below. Furthermore, in the description of the drawings, the same portions are appropriately denoted by the same reference numerals.

FIG. 1 is a diagram illustrating a configuration of a power system according to the embodiment. A power system 1 includes a plurality of power converters 11 to 14, power elements 21 to 24, and a bus 30. Further, the power system 1 includes an energy management system (EMS) 40. The EMS 40 is an example of a central control device.

The bus 30 is a DC bus in the power system 1, and is connected to the power converters 11 to 14. The bus 30 is an electric line that transmits DC power. The power converters 11, 12, and 13 are DC/DC converters that convert a DC voltage, and the power converter 14 is an AC/DC converter that converts alternating current (AC) into DC. Each of the power converters 11 to 14 has a function of performing wired or wireless information communication. The configuration and function of each of the power converters 11 to 14 will be described in detail later.

The power element 21 is, for example, a stationary electrical storage device capable of being charged and discharged, and is connected to the power converter 11. The stationary electrical storage device is an example of an in-facility electrical storage device which is permanently installed. The power converter 11 has a function of converting the voltage of the DC power supplied by the power element 21 and outputting the converted voltage to the bus 30, and converting the voltage of the DC power supplied from the bus 30 and outputting the converted voltage to the power element 21 to charge the power element 21.

The power element 22 is, for example, a photovoltaic power generation device capable of generating and supplying electric power, and is connected to the power converter 12. The photovoltaic power generation device is an example of a power generation device that generates power using renewable energy. The power converter 12 has a function of converting the voltage of the DC power supplied by the power element 22 and outputting the converted voltage to the bus 30.

The power element 23 is, for example, an in-vehicle electrical storage device capable of supplying and consuming electric power and being charged, and is connected to the power converter 13. The in-vehicle electrical storage device is mounted on an electric vehicle EV, and is an example of a moving non-stationary electrical storage device. The power converter 13 has a function of converting the voltage of the DC power supplied by the power element 23 and outputting the converted voltage to the bus 30, and converting the voltage of the DC power supplied from the bus 30 and outputting the converted voltage to the power element 23 to charge the power element. The power converter 13 is provided in, for example, a charging station or a residential charging facility, but may be mounted on an electric vehicle EV.

The power element 24 is, for example, a commercial electric power system, and is connected to the power converter 14. The power converter 14 converts AC power supplied from the power element 24 into DC power to output the DC power to the bus 30, and converts DC power supplied from the bus 30 into AC power to output the AC power to the power element 24. The output of power from the bus 30 to the power element 24 is also referred to as a reverse power flow.

The EMS 40 has a function of integrally managing the state of the power system 1. The EMS 40 includes a control unit 41, a storage unit 42, and a communication unit 43.

Figure 2:
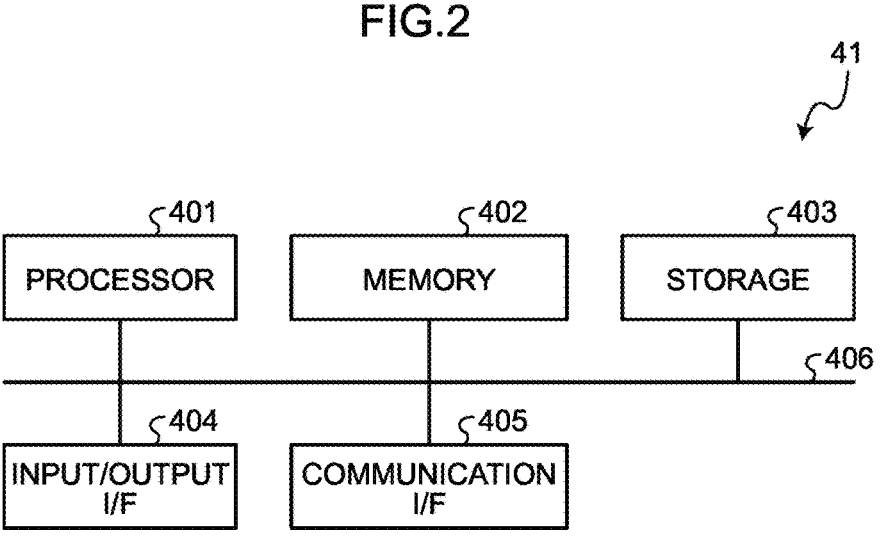
FIG. 2 is a block diagram illustrating a configuration of a control unit of an EMS.

FIG. 2 is a block diagram illustrating a configuration of the control unit 41. The control unit 41 is configured by connecting a processor 401, a memory 402, a storage 403, an input/output I/F 404, and a communication I/F 405 to a bus 406. The memory 402 is, for example, a RAM, and includes a volatile memory or a nonvolatile memory. The memory 402 serves as a work space when the processor 401 performs arithmetic processing, and stores a result of the arithmetic processing of the processor and the like. The storage 403 includes a read only memory (ROM) and an auxiliary storage device such as a hard disk drive (HDD) or a solid state drive (SSD). The storage 403 stores programs and data used by the processor 401 to perform arithmetic processing. The input/output I/F 404 is connected to the storage unit 42, and writes information to the storage unit 42 and reads information from the storage unit 42. The communication I/F 405 is connected to the communication unit 43 and controls the communication unit 43. The processor 401 is, for example, a central processing unit (CPU), reads a program from the storage 403, and executes the program with the memory 402 as a work space. The processor 401 may be an application specific integrated circuit (ASIC), a field-programmable gate array (FPGA), a digital signal processor (DSP), or a graphics processing unit (GPU). The processor 401 executes the program to implement the function of the EMS 40.

The storage unit 42 includes, for example, an HDD or an SSD to store various pieces of data and the like used by the control unit 41 to perform arithmetic processing. The storage unit 42 stores, for example, data indicating a line impedance of the bus 30, data indicating a wiring topology of the bus 30, data indicating an operating voltage range of voltage conversion of each of the power converters 11 to 14, and the like as various pieces of data.

The communication unit 43 includes a communication module that performs wired or wireless information communication. The communication unit 43 performs information communication with each power converter included in the power system 1 and an external server 60 via a network NW including an Internet line network, a mobile phone line network, and the like.

Figure 3:
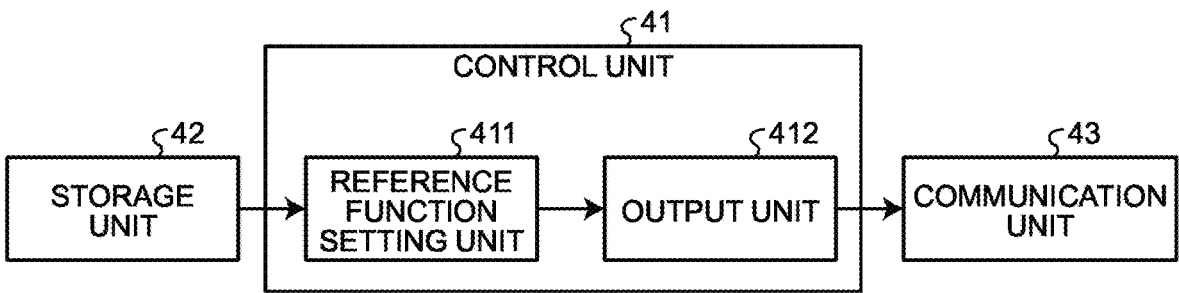
FIG. 3 is a functional block diagram of the EMS.

FIG. 3 is a diagram illustrating a functional unit according to the present disclosure realized in the control unit 41 by the processor 401 executing a program. A reference function setting unit 411 sets a reference function of each of the power converters 11 to 14. An output unit 412 outputs an update command including the reference function set by the reference function setting unit 411 to the power converters 11 to 14.

Note that the external server 60 is a server provided outside the power system 1. For example, the external server 60 is an information processing device configured to function as an EMS in another power system, or an information processing device that includes a database and functions as a data server with respect to the EMS 40. The external server 60 stores various types of information that may affect the operation of the power system 1.

Figure 4:
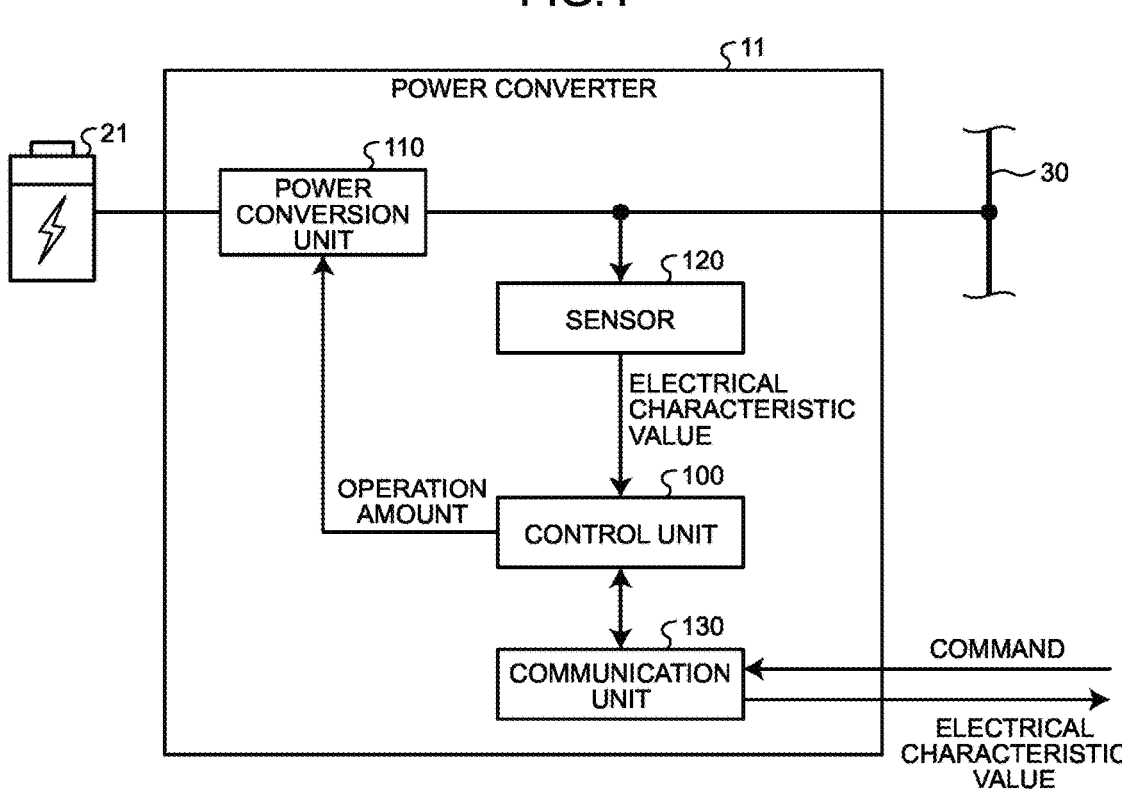
FIG. 4 is a block diagram illustrating a configuration of a power converter.

Next, a specific configuration of the power converter 11 will be described. FIG. 4 is a diagram illustrating a configuration of the power converter 11. The power converter 11 includes a power conversion unit 110, a sensor 120, a control unit (controller) 100, and a communication unit 130.

The power conversion unit 110 performs a DC/DC conversion for converting a voltage of DC power input from the discharging power element 21 and outputting the converted voltage to the bus 30. The power conversion unit 110 may also convert a voltage of DC power input from the bus 30 to output the converted voltage to the power element 21 to charge the power element 21. The power conversion unit 110 is constituted by an electric circuit including, for example, a coil, a capacitor, a diode, a switching element, and the like. The switching element is, for example, a field effect transistor or an insulated gate bipolar transistor. The power conversion unit 110 may control power conversion characteristics by, for example, pulse width modulation (PWM) control.

The sensor 120 measures an electrical characteristic value of power on the bus 30 side of the power conversion unit 110. Accordingly, the sensor 120 measures an electrical characteristic value of power input to the power converter 11 or output from the power converter 11. The sensor 120 may measure a current value, a voltage value, a power value, and the like. The sensor 120 is an example of a measurement unit that acquires an electrical characteristic value. The sensor 120 outputs the measured electrical characteristic value to the control unit 100.

The control unit 100 includes a processor that performs various types of arithmetic processing for controlling the operation of the power conversion unit 110 and a storage unit in order to mainly realize the power conversion function of the power converter 11. As the processor, those exemplified as the configuration of the processor 401 may be used, and as the storage unit, those exemplified as the configuration of the storage 403 may be used. The function of the control unit 100 is realized as a functional unit by the processor reading and executing various programs from the storage unit. For example, the control unit 100 controls the power conversion characteristic of the power conversion unit 110 according to a reference function based on the local power (P) and the local voltage (V). Specifically, the control unit 100 outputs a PWM signal including information about an operation amount (for example, the duty ratio) for PWM control to the power conversion unit 110, and PWM controls the power conversion unit 110. Note that the control unit 100 may directly output the operation amount to the power conversion unit 110, or may output the operation amount to the power conversion unit 110 via another functional unit (for example, a loop control unit) (not illustrated).

The communication unit 130 includes a communication module that performs wired or wireless information communication, and a communication control unit that controls an operation of the communication module. The communication unit 130 performs information communication with the EMS 40 via the network NW. For example, the communication unit 130 receives information and a command from the EMS 40 to output the information and the command to the control unit 100. In addition, the communication unit 130 transmits, for example, information about the power status input from the control unit 100 to the EMS 40. Note that, in a case where the information about the power status is the measurement value by the sensor 120, the communication unit 130 may transmit, for example, the measurement value input from the sensor 120 to the EMS 40.

Figure 5:
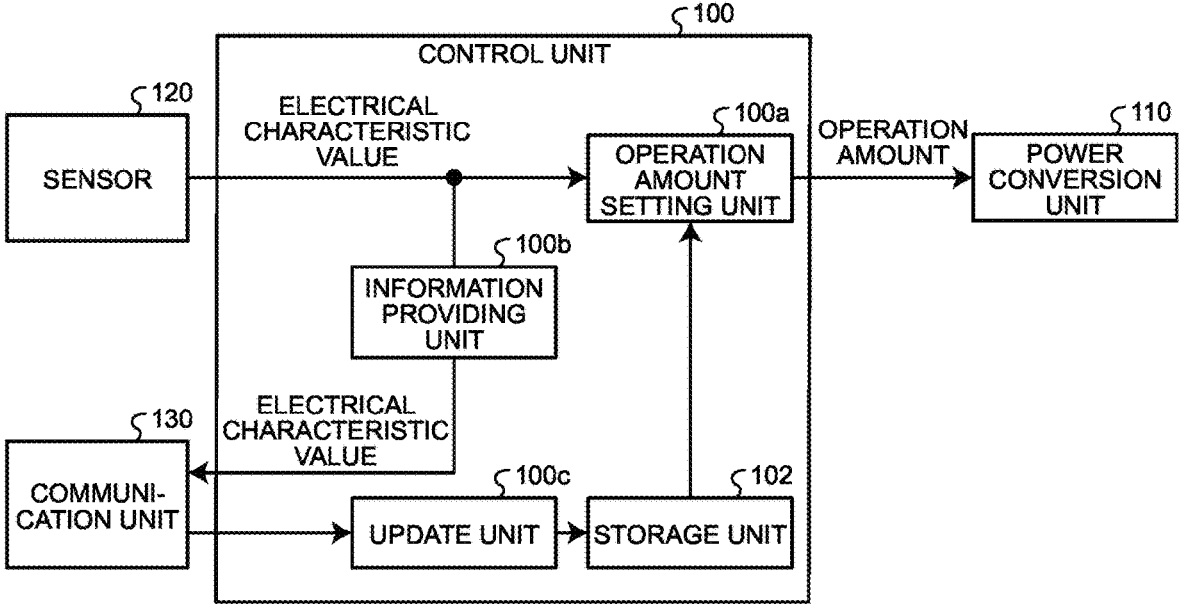
FIG. 5 is a diagram illustrating a functional unit implemented in a control unit of the power converter.

FIG. 5 is a diagram illustrating a functional unit according to the present disclosure realized in the control unit 100. The control unit 100 includes an operation amount setting unit 100a, an information providing unit 100b, and an update unit 100c, which are functional units implemented as software by execution of a program. The information providing unit 100b acquires the electrical characteristic value output from the sensor 120 to output the acquired electrical characteristic value to the communication unit 130.

The operation amount setting unit 100a, which is an example of a characteristic control unit, controls the power conversion characteristic of the power conversion unit 110. Specifically, the operation amount setting unit 100a sets the target value of the output of the power conversion unit 110 based on the electrical characteristic value measured by the sensor 120 and the reference function information stored in a storage unit 102 included in the control unit 100. The target value is an electrical characteristic value, for example, a voltage value or a power value. In addition, the operation amount setting unit 100a performs feedback control of setting an operation amount (for example, the duty ratio) for PWM control so that a difference between the electrical characteristic value measured by the sensor 120 and the set target value falls within a predetermined range. The feedback control performed by the operation amount setting unit 100a may be executed using a known method such as PID control executed by reading parameters such as a proportional gain, an integral time, and a differential time stored in the storage unit 102 of the control unit 100 in advance. The operation amount setting unit 100a outputs information about the set operation amount to the power conversion unit 110 and controls the power conversion unit 110.

The update unit 100c stores the reference function information included in the update command input from the communication unit 130 in the storage unit 102 of the control unit 100, and updates the reference function information stored in the storage unit 102. The update command is a command transmitted from the EMS 40. Here, the reference function information is various types of information for identifying the reference function, which will be described in detail later.

Note that each of the other power converters 12, 13, and 14 may have the same configuration as the power converter 11. However, the power conversion unit 110 of the power converter 14 performs AC/DC conversion of converting AC power supplied from the power element 24 into DC power and outputting the DC power to the bus 30, and DC/AC conversion of converting DC power supplied from the bus 30 into AC power and outputting the AC power to the power element 24.

Figure 6A:
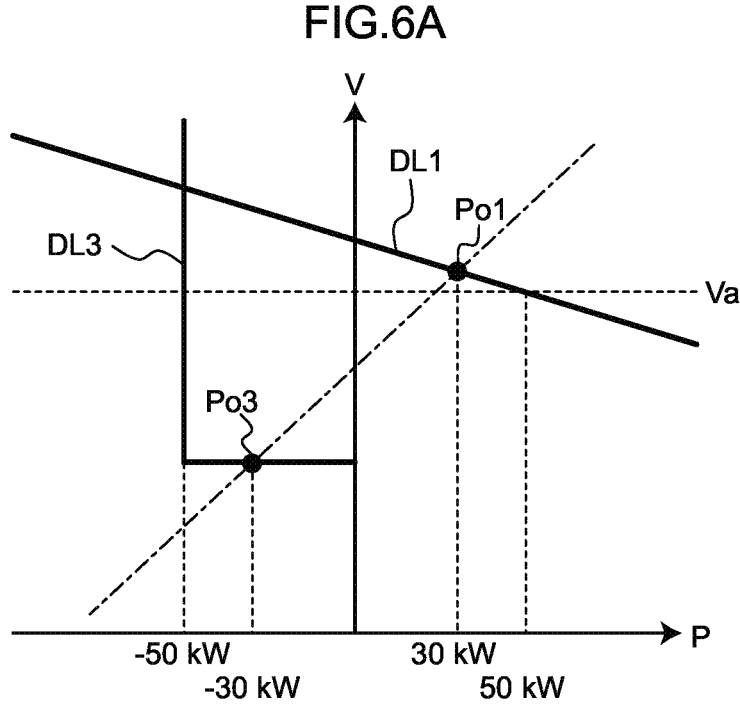
FIG. 6A is a diagram illustrating an example of a reference function.

Next, a reference function based on which the control unit 100 controls the power conversion characteristic of the power conversion unit 110 will be described. FIG. 6A is a diagram illustrating an example of a reference function indicated by reference function information. The reference function information is various types of information for identifying the reference function. In FIG. 6A, the vertical axis represents voltage V, and the horizontal axis represents power P. A reference function indicated by the line DL1 in FIG. 6A indicates a V-P characteristic that is a relationship between the power P and the voltage V on the bus 30 side of the power conversion unit 110 included in the power converter 11, and indicates a power conversion characteristic of the power conversion unit 110. A reference function indicated by the line DL3 in FIG. 6A indicates a power conversion characteristic of the power conversion unit 110 included in the power converter 13. Note that the power P is a positive value in a case where the power conversion unit 110 supplies power to the bus 30, that is, the power element 21 is in the discharging state, and is a negative value in a case where the power is supplied from the bus 30, that is, the power element 21 is in the charging state. In addition, the state where the power P=0 is a state where neither charging nor discharging is performed.

The reference function represented by the line DL1 is configured by a function defined according to the section of the input value. The reference function represented by the line DL3 is configured by connecting a plurality of functions having different drooping characteristics, the functions being defined according to the section of the input value. The line DL1 and the line DL3 are identified by the reference function information. Note that the reference function may have a bent linear shape or a curved shape, and may be configured by connecting a plurality of functions having different drooping characteristics defined according to a section of the input value. The reference function information includes, for example, coordinate information of a boundary of a function in coordinates in which a horizontal axis is P and a vertical axis is V, intercept information of the function, information about an inclination (that is, a drooping coefficient), and information about a shape (straight line, curve, etc.).

The control unit 100 of the power converter 11 controls the power conversion characteristic of the power conversion unit 110 to be a characteristic of a reference function indicated by the line DL1. That is, the control unit 100 of the power converter 11 controls the power conversion unit 110 so that the operating point defined by the value of V and the value of P is located on the line DL1. The reference function is not limited to the function of the drooping characteristic, and may be another function as long as the target value of the electrical characteristic value is defined according to the input value.

Examples of the method of controlling the power conversion unit 110 executed by the control unit 100 include droopP control and droopV control. The droopP control is a control method in which a target power value that is a target value is determined based on a voltage value that is an electrical characteristic value measured by the sensor 120 and a reference function, and a difference between a measurement value of power by the sensor 120 and the target power value is set to be equal to or less than an allowable range. The droopV control is a control method in which a target voltage value that is a target value is determined based on a power value or a current value that is an electrical characteristic value measured by the sensor 120 and a reference function, and a difference between the measurement value of the voltage by the sensor 120 and the target voltage value is set to be equal to or less than an allowable range. A current value may be used as an electrical characteristic value such as a measurement value or a target value instead of a power value. In this case, for example, the reference function is defined as a V-I characteristic that is a relationship between the current (I) for the horizontal axis and the voltage (V) for the vertical axis. In addition, for example, feedback control in which the control unit 100 determines a target current value, which is a current value of the target value, based on the measurement value of the voltage by the sensor 120 and the reference function information, and sets an operation amount so that a difference between the target current value and the measurement value of the current by the sensor 120 falls within an allowable range is referred to as droopI control, and is executed in place of the droopP control.

Note that, also for the power converters 12, 13, and 14, reference function information corresponding to each power converter is stored in the storage unit 102, and control is performed so that characteristics of the reference function identified by the stored reference function information are obtained.

Next, a method of controlling each of the power converters 11 to 14 and a method of controlling the power system 1 will be described. In the power system 1, so-called dispersion control in which each of the power converters 11 to 14 performs control in an autonomously dispersion manner, and central control in which the EMS 40 cooperatively controls each of the power converters 11 to 14 according to the power status of the power system 1 may be executed. Note that, for example, the dispersion control is repeatedly executed at a relatively short period, and the central control is executed at an interval longer than the period of the dispersion control. Dispersion control is also referred to as primary control, and central control is also referred to as secondary control. These control methods are executed by a processor executing a program in each power converter or the EMS 40, for example.

First, the central control will be described. In the following example, the storage unit 102 of each of the power converters 11 to 14 stores the reference function information in an updatable manner. The EMS 40 executes central control by updating a reference function used for control by each of the power converters 11 to 14 by a command. Updating the reference function by the command means that the command transmitted from the EMS 40 to each of the power converters 11 to 14 includes reference function information related to the reference function, and part or the whole of the reference function information stored in each of the power converters 11 to 14 is updated by the command. As described above, the reference function information is the coordinate information of the boundary of the function, the intercept information of the function, the information about the inclination (that is, the drooping coefficient), and the information about the shape (straight line, curve, etc.). The reference function information used for the update is stored in the storage unit 42 of the EMS 40, and is appropriately read and used by the control unit 41.

Figure 7:
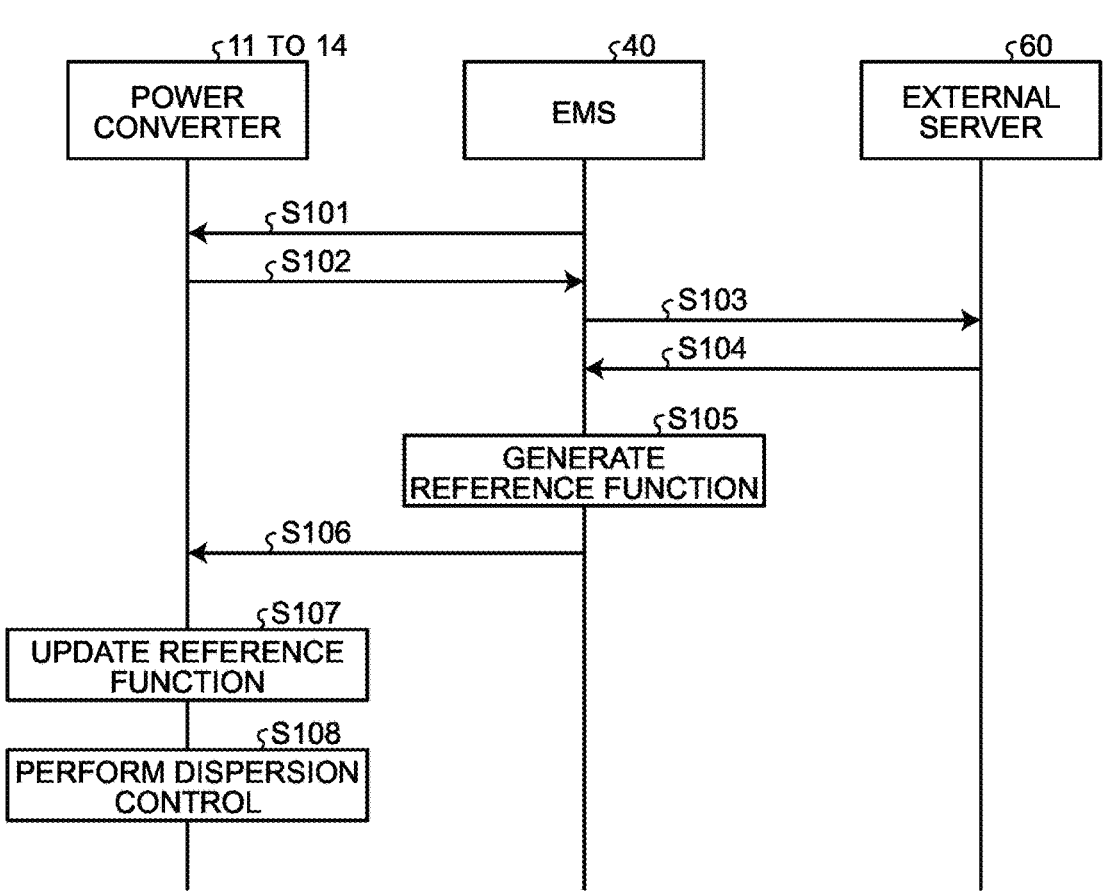
FIG. 7 is a sequence diagram illustrating an example of an operation of central control of the power system.

Next, an example of the operation of the central control in the power system 1 will be described with reference to the sequence diagram of FIG. 7. In the power system 1, the processing illustrated in FIG. 7 is performed at a predetermined period. First, the EMS 40 requests the local measurement information from each of the power converters 11 to 14 (step S101). The local measurement information is an example of information about the power status of the power system 1, and includes the electrical characteristic value measured by the sensor 120 of each of the power converters 11 to 14 and the measurement time of the electrical characteristic value.

Next, each of the power converters 11 to 14 transmits the acquired local measurement information to the EMS 40 (step S102). The EMS 40 stores the local measurement information in the storage unit 42. Next, as an example of the information about the power status of the power system 1, the EMS 40 requests the external server 60 for various types of information that may affect the operation of the power system 1 (step S103). In this example, the EMS 40 requests an external server 60 for the power generation amount/demand prediction information. The power generation amount/demand prediction information includes prediction information about a power generation amount in the power system 1 and demand prediction information about electric power, and may include, for example, information such as a season of an area where the power system 1 is installed, current weather, and future weather forecast. In addition, in a case where the external server 60 functions as the EMS of another power system, when there is a possibility that the operation state of the another power system affects the operation of the power system 1, the power generation amount/demand prediction information may include prediction information of the power generation amount and demand prediction information of power in the another power system. Next, the external server 60 transmits the power generation amount/demand prediction information to the EMS 40 (step S104). The EMS 40 stores the power generation amount/demand prediction information in the storage unit 42.

Figure 8:
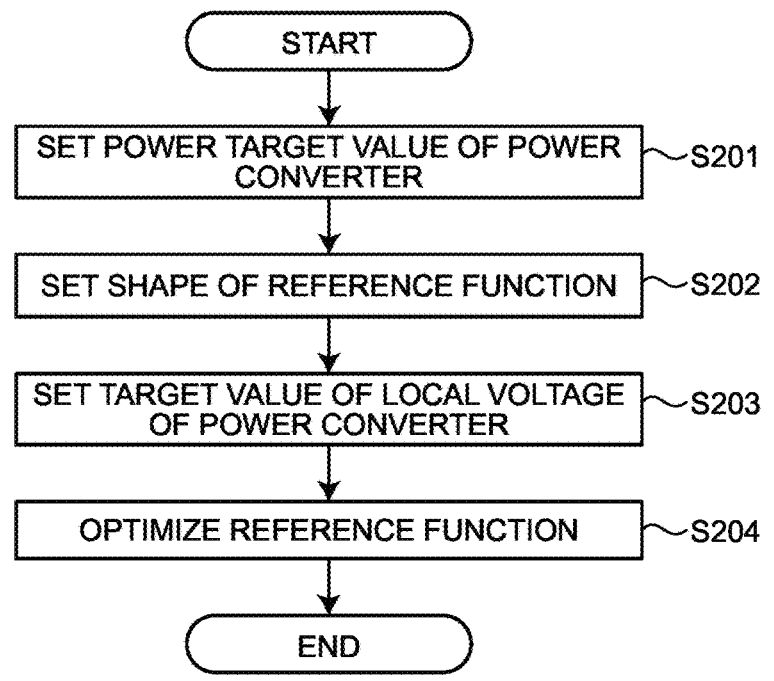
FIG. 8 is a flowchart illustrating a flow of a process performed by a control unit of the EMS.

Next, the control unit 41 of the EMS 40 reads each piece of transmitted information, that is, information about the power status of the power system 1, and the like from the storage unit 42 to generate a reference function of each of the power converters 11 to 14 based on the information (step S105). FIG. 8 is a flowchart illustrating a flow of processing of generating a reference function. This processing is a process performed by the reference function setting unit 411, and is an example of a reference function setting step.

First, the control unit 41 sets the power target value of the supply or demand of each of the power converters 11 to 14 from the power generation amount/demand prediction information stored in the storage unit 42 (step S201). The power target value may be set by executing operation optimization calculation of the power system 1, and the operator may set the power target value from the power generation amount/demand prediction information in the EMS 40. In addition, the power target value may be set from the local measurement information acquired from each of the power converters 11 to 14.

The operation optimization calculation is executed to apply to various conditions. For example, it is assumed that the power system 1 is controlled so that the bus 30 is an operating point of a predetermined voltage. In this state, it is assumed that the EMS 40 determines, based on the power generation amount/demand prediction information, that the future weather of the area where the power element 22 that is a photovoltaic power generation device is installed is fine and the power generation amount is expected to increase, and that the power element 22 has a margin in terms of power supply from the local measurement information acquired from the power converter 12 connected to the power element 22. In this case, the EMS 40 determines to update the reference function of the power converter 11 connected to the power element 21 so that the power element 21, which is a stationary electrical storage device, is charged at the operating point. In addition, at the same time as the update, the EMS 40 determines to update the reference function of the power converter 14 connected to the power element 24 so that power is not supplied from the power element 24 which is a commercial electric power system. In addition, the operation optimization calculation may also be set and executed under conditions from the viewpoint of not exceeding the contract power of the power element 24 which is a commercial electric power system or from the viewpoint of optimizing the electricity rate, such as peak cut and utilization of nighttime power.

Next, the control unit 41 sets the shape of the reference function of each of the power converters 11 to 14 (step S202). For example, when the power target value of the power converter 13 set in step S201 is a negative value and the power element 23 is charged, the control unit 41 sets the shape of the reference function of the power converter 13 to the shape of the line DL3 illustrated in FIG. 6A so that the power converter 13 charges the power element 23. In addition, when the power target value of the power converter 11 set in step S201 is a positive value and the power element 21 is charged by the power supply from the power element 23, the control unit 41 sets the shape of the reference function of the power converter 11 to the shape of the line DL1 illustrated in FIG. 6A so that the power converter 11 supplies power.

Next, the control unit 41 calculates a voltage drop in the electric path of the bus 30 using the power target value set in step S201, the data indicating the line impedance of the bus 30 stored in the storage unit 42, the data indicating the wiring topology of the bus 30 stored in the storage unit 42, the data indicating the operating voltage range of each of the power converters 11 to 14 stored in the storage unit 42, and the like, and sets a voltage target value, which is a target value of the local voltage of each of the power converters 11 to 14 when outputting the power target value set in step S201, based on the calculated voltage drop (step S203).

Figures 9, 10:
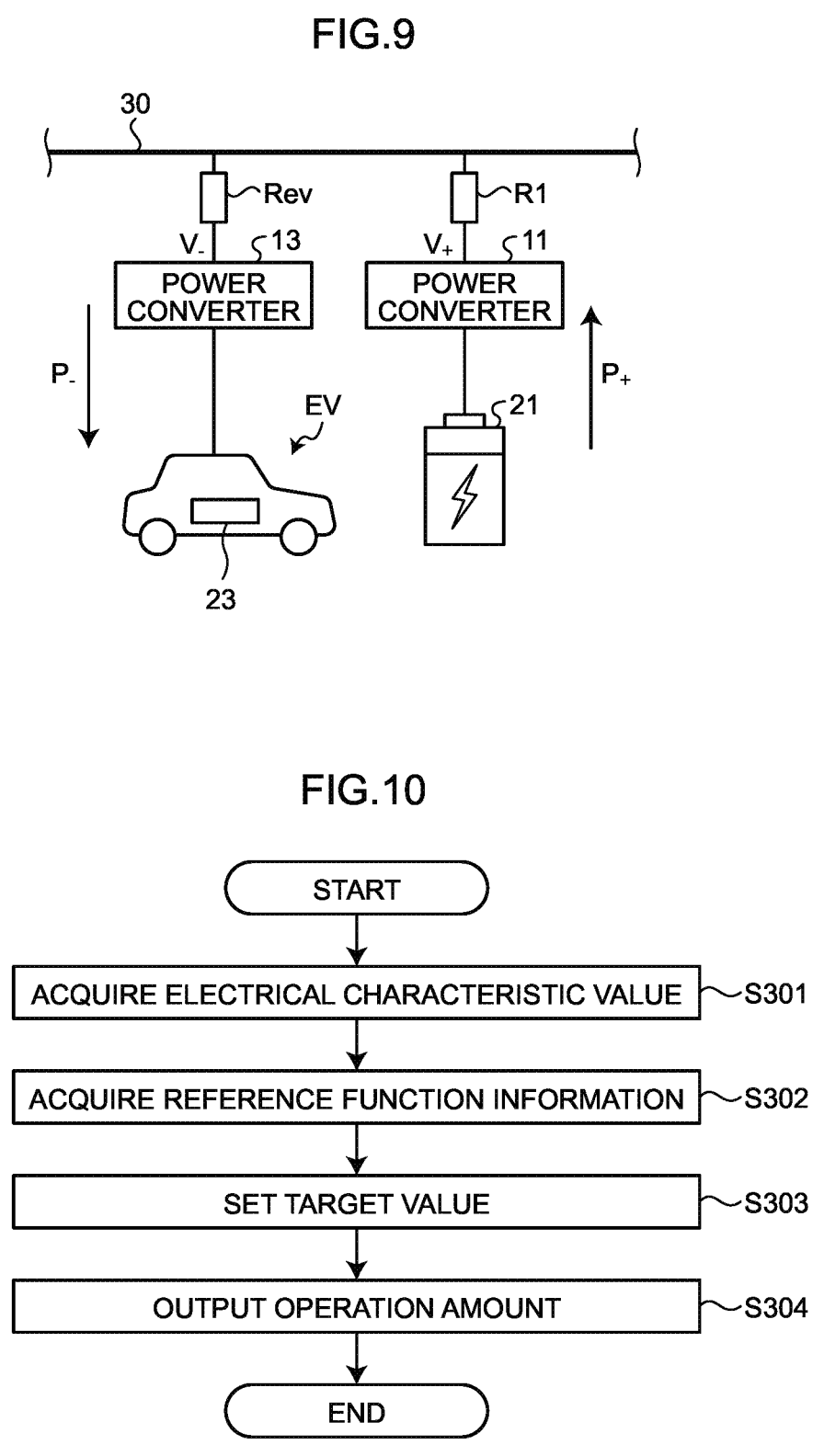

FIG. 9 is a diagram illustrating an example of a relationship between power supply and demand in the power system 1. For example, assuming a case where the power element 23 is charged by the power supply from the power element 21 as illustrated in FIG. 9, when the power target value of the power converter 11 is $P_+$, the target value of the local voltage of the power converter 11 is $V_+$, the power target value of the power converter 13 is $P_-$, the target value of the local voltage of the power converter 13 is $V_-$, the line impedance of the power converter 11 is R1, and the line impedance of the power converter 13 is Rev, the control unit 41 sets $V_+$ and $V_-$ so that $P_+=P_-$, $V_+$ falls within the operating voltage range of the power converter 11, and $V_-$ falls within the operating voltage range of the power converter 13.

Next, the control unit 41 optimizes the reference function of the shape set in step S202 based on the target value of the local voltage set in step S203 so that the power value of the output of the power converter when the local voltage is the voltage target value is the power target value (step S204). Here, an example of the processing in step S204 will be described with reference to FIGS. 6A and 6B. An alternate long and short dash line illustrated in FIGS. 6A and 6B indicates a voltage drop between the power converter 11 and the power converter 13. FIG. 6A is an example of a reference function before optimization is performed in step S204.

In a case where no voltage drop occurs in the bus 30, for example, when the local voltage is Va illustrated in FIG. 6A in the power converter 11 and the power converter 13, the power converter 11 supplies power to the bus 30 at 50 kW which is the power target value when the local voltage is Va on the line DL1, and the power converter 13 charges the power element 23 at −50 kW which is the power target value when the local voltage is Va on the line DL3. However, when a voltage drop occurs between the power converter 11 and the power converter 13 along the alternate long and short dash line illustrated in FIG. 6A, the position of the operating point of the power converter 11 is Po1 illustrated in FIG. 6A, and the position of the operating point of the power converter 13 is Po3 illustrated in FIG. 6A. When the position of the operating point is Po3, the power converter 13 performs constant voltage control according to the line DL3 to charge the power element 23 at −30 kW. Further, when the position of the operating point is the position of Po1, the power converter 11 suppresses the output from the power element 21 to 30 kW according to the line DL1.

Figure 6B:
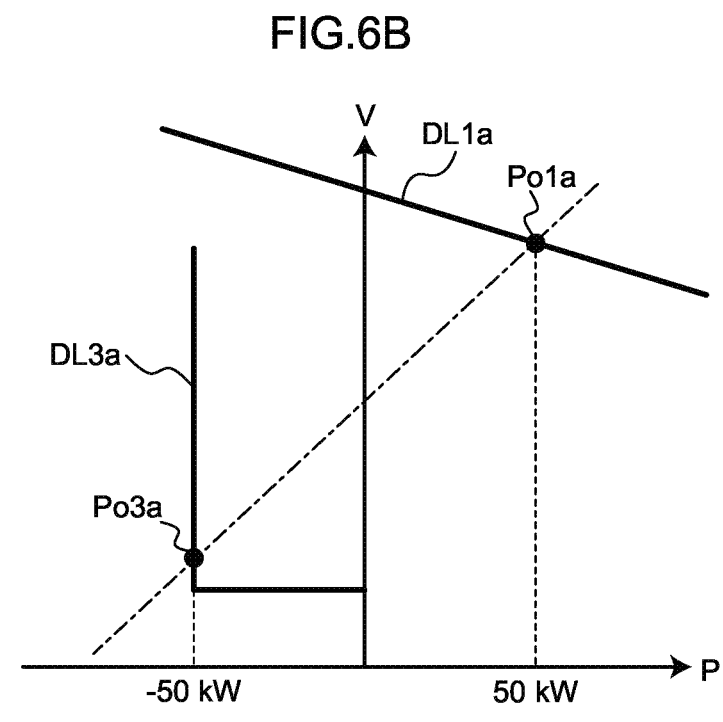
FIG. 6B is a diagram illustrating an example of a reference function.

Therefore, the control unit 41 performs the optimization process in step S204, changes the intercept information of the line DL1, and shifts the line upward to obtain the line DL1*a* illustrated in FIG. 6B. In addition, the control unit 41 changes the intercept information of the line DL3 and shifts the line downward to obtain the line DL3*a* illustrated in FIG. 6B. When this optimization is performed, the position of the operating point of the power converter 11 is the position of Po1*a* illustrated in FIG. 6B, and the position of the operating point of the power converter 13 is the position of Po3*a* illustrated in FIG. 6B. When the position of the operating point is the position of Po3*a*, the power converter 13 performs constant power control according to the line DL3*a* and charges the power element 23 with −50 kW. Further, when the position of the operating point is the position of Po1, the power converter 11 sets the output from the power element 21 to 50 KW according to the line DL1*a*. As a result, even when a voltage difference occurs between the power converter 11 and the power converter 13 due to a voltage drop, power interchange is not suppressed, and power may be supplied from the power converter 11 at 50 kW and the power element 23 may be charged at −50 kW. Note that the control unit 41 may obtain the target power value by changing the inclination instead of changing the intercept information of the line DL1.

Returning to FIG. 7, the EMS 40 that has generated the reference function outputs an update command including the generated reference function information (step S106). The output unit 412 outputs the update command. Step S106 is an example of an output step. Next, the power converter to be updated in each of the power converters 11 to 14 acquires an update command of the reference function and updates the reference function information (step S107). The power control device that has updated the reference function information executes dispersion control (step S108).

Note that the control unit 41 may execute the processing illustrated in FIG. 8 when the wiring topology is changed, when the power converter connected to the bus 30 is increased or decreased, when the local measurement information of the power converter is changed, or when that the supply and demand power of the power converter is suppressed is detected by the local measurement information transmitted from the power converter.

Next, a control method of dispersion control in each of the power converters 11 to 14 will be described using the power converter 11 as an example. Note that, in the other power converters 12 to 14, a control method similar to that described below may be appropriately executed.

In the method of controlling the power converter 11, the control unit 100 executes a control step of controlling the power conversion characteristic of the power converter 11, that is, the power conversion characteristic of the power conversion unit 110 based on the reference function. An example of content of this control step will be specifically described with reference to FIG. 10. FIG. 10 is a flowchart illustrating a flow of a process performed by the control unit 100.

The control unit 100 executes the processing illustrated in FIG. 10 at a predetermined period, for example. First, the control unit 100 acquires the electrical characteristic value measured by the sensor 120 (step S301). Next, the control unit 100 acquires the reference function information from the storage unit 102 (step S302).

Next, the control unit 100 sets a target value of the output of the power converter 11 (step S303). Here, when performing the droopP control, the control unit 100 sets, as a target value, a power value of a reference function that intersects when a line is drawn along the horizontal axis from a voltage value measured by the sensor 120. In addition, in a case of performing the droopV control, when the reference function is the V-P characteristic, the control unit 100 sets, as the target value, the voltage value of the reference function that intersects when a line is drawn along the vertical axis from the power value measured by the sensor 120, and when the reference function is the V-I characteristic, the control unit 100 sets, as the target value, the voltage value of the reference function that intersects when a line is drawn along the vertical axis from the current value measured by the sensor 120.

Next, the control unit 100 sets an operation amount for PWM control so that a difference between the electrical characteristic value measured by the sensor 120 and the target value set in step S203 falls within a predetermined range to output the set operation amount to the power conversion unit 110 (step S304). As a result, control of the power conversion unit 110 is executed.

Figure 11:
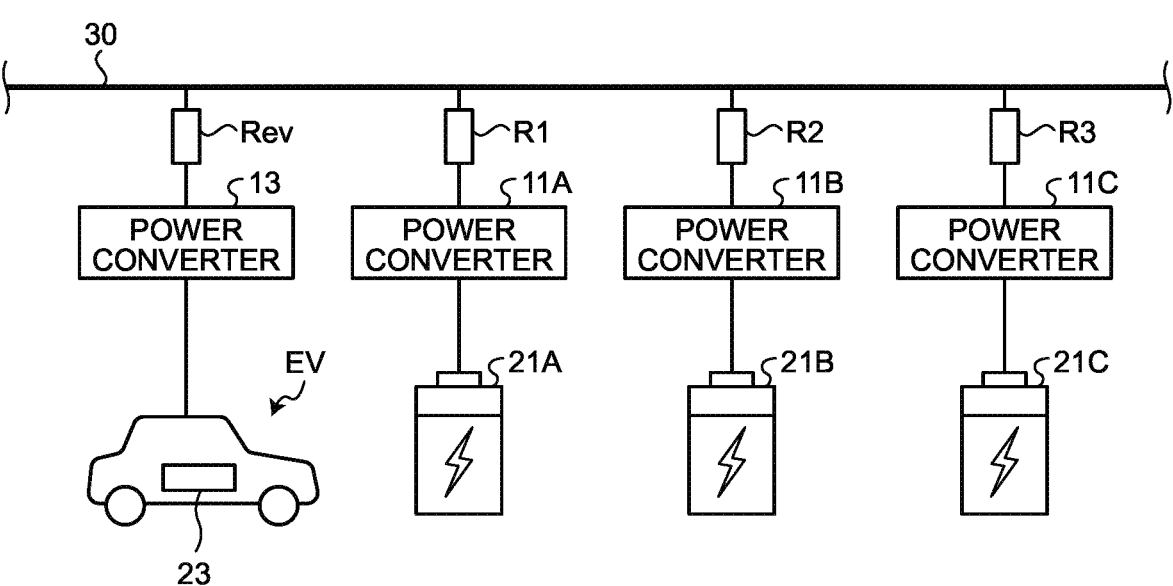
FIG. 11 is a diagram illustrating a power element and a power converter included in the first example.

Next, the first example of the optimization of the reference function described above will be described. FIG. 11 is a diagram illustrating a power element and a power converter included in the first example. Note that the same components as those in the above-described embodiment are denoted by the same reference numerals, and description thereof is omitted. In the first example, the power elements 21A, 21B, and 21C, the power element 23, the power converters 11A, 11B, and 11C, and the power converter 13 are included in the power system 1. Each of the power elements 21A, 21B, and 21C is the same stationary electrical storage device as the power element 21. The power element 21A is connected to the power converter 11A, the power element 21B is connected to the power converter 11C, and the power element 21C is connected to the power converter 11C.

Each of the power converters 11A, 11B, and 11C is the same power converter as the power converter 11. The power converter 11A has a function of converting the voltage of the DC power supplied by the power element 21A and outputting the converted voltage to the bus 30, and converting the voltage of the DC power supplied from the bus 30 and outputting the converted voltage to the power element 21A to charge the power element 21A. The power converter 11B has a function of converting the voltage of the DC power supplied by the power element 21B and outputting the converted voltage to the bus 30, and converting the voltage of the DC power supplied from the bus 30 and outputting the converted voltage to the power element 21B to charge the power element 21B. The power converter 11C has a function of converting the voltage of the DC power supplied by the power element 21C and outputting the converted voltage to the bus 30, and converting the voltage of the DC power supplied from the bus 30 and outputting the converted voltage to the power element 21C to charge the power element 21B.

In the first example, the line impedance of the power converter 13 is Rev, the line impedance of the power converter 11A is R1, the line impedance of the power converter 11B is R2, the line impedance of the power converter 11C is R3, and Rev=R1=R2=R3.

Figure 12A:
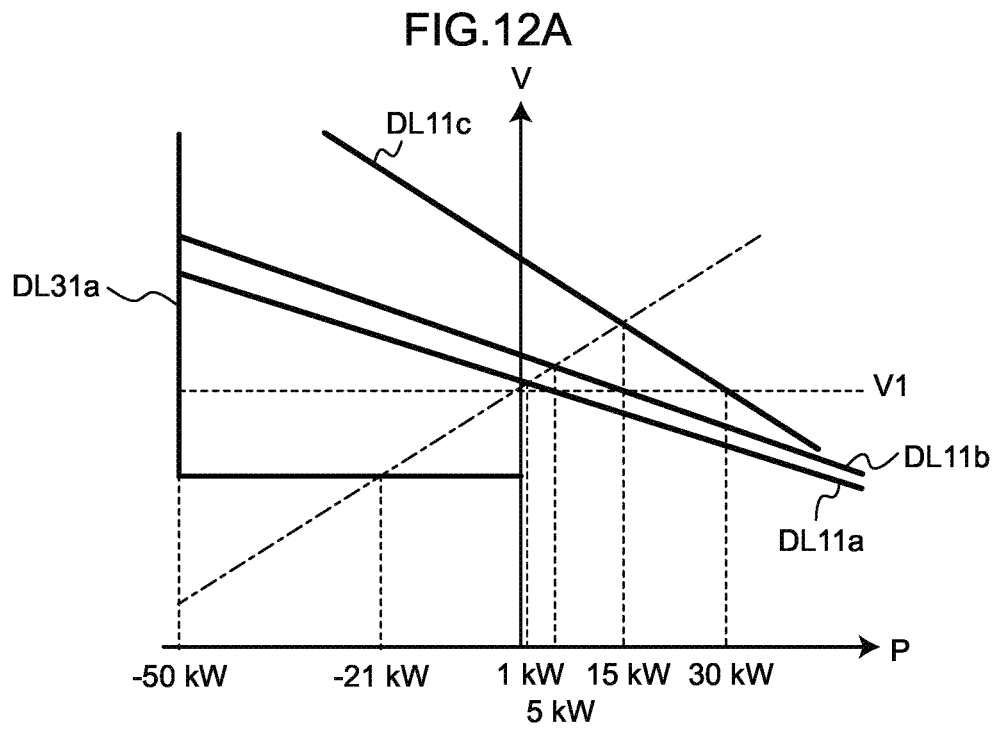
FIG. 12A is a diagram illustrating an example of the reference function.

FIG. 12A is a diagram illustrating an example of the reference function set in step S202 in the first example. For example, when charging the power element 23 with the power supply from the power elements 21A, 21B, and 21C, the control unit 41 sets the shape of the reference function of the power converter 11A to the shape of the line DL11a illustrated in FIG. 12A, sets the shape of the reference function of the power converter 11B to the shape of the line DL11b illustrated in FIG. 12A, and sets the shape of the reference function of the power converter 11C to the shape of the line DL11c illustrated in FIG. 12A. In addition, when the power element 23 is charged with the power supply from the power elements 21A, 21B, 21C, the control unit 41 sets the shape of the reference function of the power converter 13 to the shape of the line DL31a illustrated in FIG. 12A.

In a case where no voltage drop occurs in the bus 30, for example, when the local voltage is V1 illustrated in FIG. 12A in each power converter, the power converter 11A supplies power to the bus 30 at 5 KW which is the power target value when the local voltage is V1 on the line DL11a, the power converter 11B supplies power to the bus 30 at 15 kW which is the power target value when the local voltage is V1 on the line DL11b, and the power converter 11C supplies power to the bus 30 at 30 KW which is the power target value when the local voltage is V1 on the line DL11c. In addition, the power converter 13 charges the power element 23 at −50 KW which is the power target value when the local voltage is V1 on the line DL31a.

A straight line indicated by an alternate long and short dash line in FIG. 12A is a line approximating the voltage drop across bus 30. Also in other figures illustrating the reference function, an alternate long and short dash line of a straight line is a line approximating the voltage drop in the bus to which the power converter is connected. When a voltage drop occurs between the power converters 11A, 11B, and 11C and the power converter 13 by the alternate long and short dash line illustrated in FIG. 12A, the power converter 13 performs power control of charging so as to have a power value at the intersection of the alternate long and short dash line and the line DL31a, and charges the power element 23 at −21 kW. In addition, the power converter 11A performs power control so as to have a power value at the intersection of the alternate long and short dash line and the line DL11a, and suppresses the output to the bus 30 to 1 kW, the power converter 11B performs power control so as to have a power value at the intersection of the alternate long and short dash line and the line DL11b, and suppresses the output to the bus 30 to 5 KW, and the power converter 11C performs power control so as to have a power value at the intersection of the alternate long and short dash line and the line DL11c, and suppresses the output to the bus 30 to 15 kW.

Figure 12B:
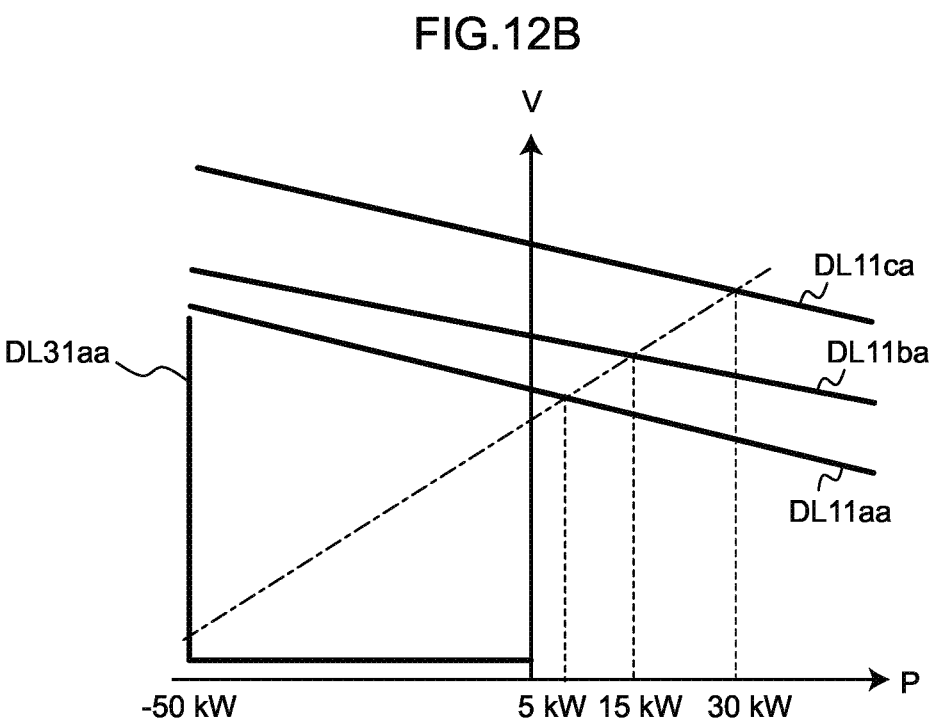
FIG. 12B is a diagram illustrating an example of the reference function.

Therefore, the control unit 41 optimizes the line DL11*a*, the line DL11*b*, and the line DL11*c* in step S204 described above. Specifically, for example, the control unit 41 changes the inclination of the line DL11*a* to the line DL11*aa* illustrated in FIG. 12B, changes the inclination of the line DL11*b* to the line DL11*ba* illustrated in FIG. 12B, and changes the inclination of the line DL11*c* to the line DL11*ca* illustrated in FIG. 12B. The control unit 41 changes the intercept information about the line DL31*a* and shifts the line downward to obtain the line DL31*aa* illustrated in FIG. 12B.

As a result, even when a voltage difference occurs due to a voltage drop in the bus 30, the power interchange is not suppressed, and the power element 23 may be charged at −50 kW with the output of the power converter 11A set to 5 kW, the output of the power converter 11B set to 15 kw, and the output of the power converter 11C set to 30 kW. In optimizing the line DL11*a*, the line DL11*b*, and the line DL11*c*, the control unit 41 may change the intercept information about the reference function to set the output from the power converter 11A to 5 KW, to set the output from the power converter 11B to 15 kW, and to set the output from the power converter 11C to 30 kW.

Next, the second example of the optimization of the reference function described above will be described. In the second example, as in the first example, the power converters 11A, 11B, and 11C, the power converter 13, the power elements 21A, 21B, and 21C, and the power element 23 are included in the power system 1. In the second example, the line impedance of the power converter 13 is Rev, the line impedance of the power converter 11A is R1, the line impedance of the power converter 11B is R2, the line impedance of the power converter 11C is R3, and Rev=R1=R2<R3.

Figure 13A:
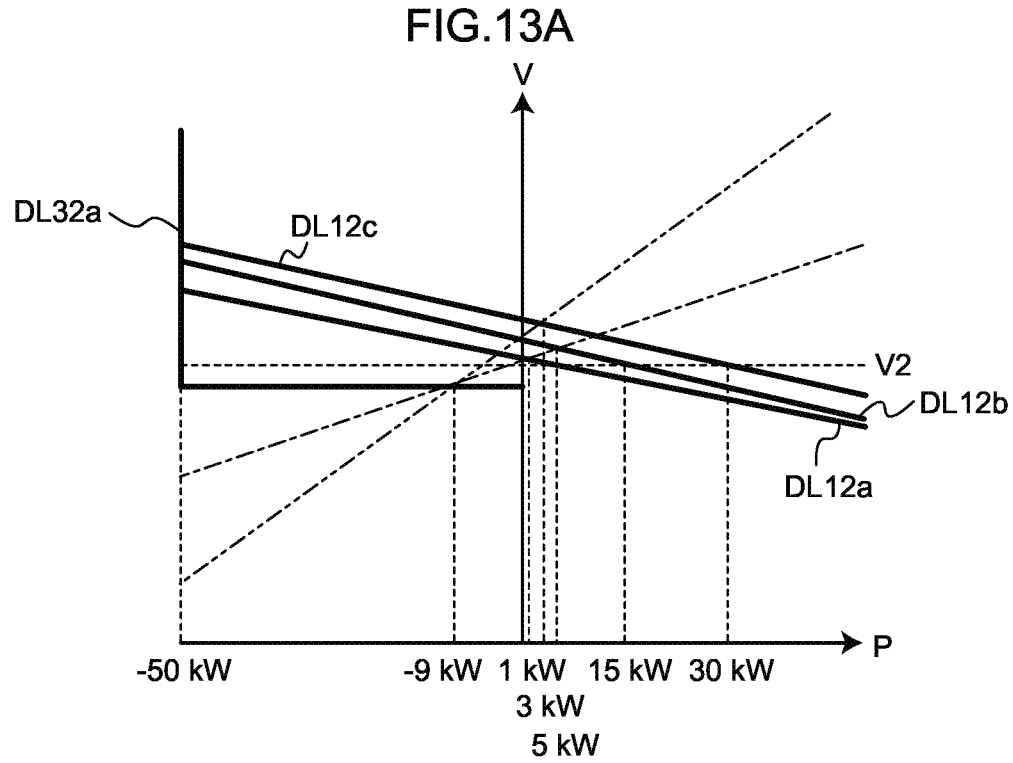
FIG. 13A is a diagram illustrating an example of the reference function.

FIG. 13A is a diagram illustrating an example of a reference function set in step S202 in the second example. For example, when charging the power element 23 with the power supply from the power elements 21A, 21B, and 21C, the control unit 41 sets the shape of the reference function of the power converter 11A to the shape of the line DL12*a* illustrated in FIG. 13A, sets the shape of the reference function of the power converter 11B to the shape of the line DL12*b* illustrated in FIG. 13A, and sets the shape of the reference function of the power converter 11C to the shape of the line DL12*c* illustrated in FIG. 13A. In addition, when charging the power element 23 with the power supply from the power elements 21A, 21B, and 21C, the control unit 41 sets the shape of the reference function of the power converter 13 to the shape of the line DL32*a* illustrated in FIG. 13A.

In a case where no voltage drop occurs in the bus 30, for example, when the local voltage is V2 illustrated in FIG. 13A in each power converter, the power converter 11A supplies power to the bus 30 at 5 kW which is the power target value when the local voltage is V2 on the line DL12*a*, the power converter 11B supplies power to the bus 30 at 15 kW which is the power target value when the local voltage is V2 on the line DL12*b*, and the power converter 11C supplies power to the bus 30 at 30 kW which is the power target value when the local voltage is V2 on the line DL12*c*. In addition, the power converter 13 charges the power element 23 at −50 kW which is the power target value when the local voltage is V2 on the line DL32*a*.

Figure 13B:
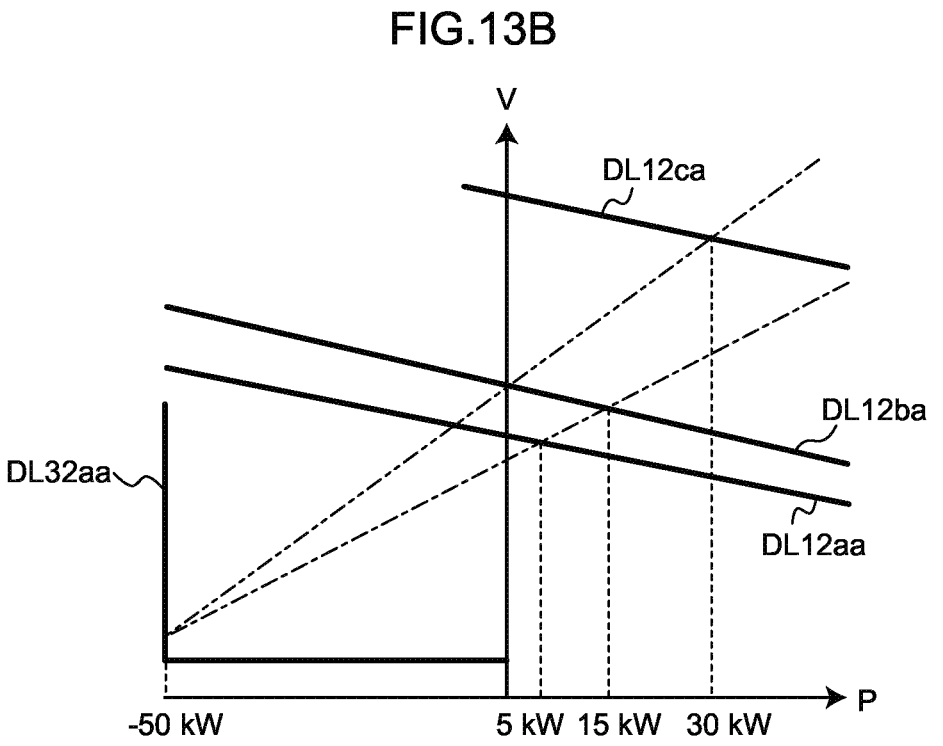
FIG. 13B is a diagram illustrating an example of the reference function.

A straight line indicated by an alternate long and short dash line and a straight line indicated by an alternate long and two short dashes line illustrated in FIGS. 13A and 13B are lines approximating the voltage drop in the bus 30. In a case where a voltage drop occurs between the power converters 11A and 11B and the power converter 13 by an alternate long and short dash line illustrated in FIG. 13A and a voltage drop occurs between the power converter 11C and the power converter 13 by an alternate long and two short dashes line illustrated in FIG. 13A, the power converter 13 performs power control of charging so as to have a power value at the intersection of the alternate long and short dash line, the alternate long and two short dashes line, and the line DL32*a*, and charges the power element 23 at −9 kW. In addition, the power converter 11A performs power control so as to have a power value at the intersection of the alternate long and short dash line and the line DL12*a*, and suppresses the output to the bus 30 to 1 KW, the power converter 11B performs power control so as to have a power value at the intersection of the alternate long and short dash line and the line DL12*b*, and suppresses the output to the bus 30 to 5 kW, and the power converter 11C performs power control so as to have a power value at the intersection of the alternate long and two short dashes line and the line DL12*c*, and suppresses the output to the bus 30 to 3 kW.

Therefore, the control unit 41 optimizes the line DL12*a*, the line DL12*b*, and the line DL12*c* in step S204 described above. Specifically, for example, the control unit 41 changes the intercept information about the line DL12*a* and shifts the line upward to obtain the line DL12*aa* illustrated in FIG. 13B, changes the intercept information about the line DL12*b* and shifts the line upward to obtain the line DL12*ba* illustrated in FIG. 13B, and changes the intercept information about the line DL12*c* and shifts the line upward to obtain the line DL12*ca* illustrated in FIG. 13B. The control unit 41 changes the intercept information about the line DL32*aa* and shifts the line downward to obtain the line DL32*aa* illustrated in FIG. 13B.

As a result, even when a voltage difference occurs due to a voltage drop in the bus 30, the power interchange is not suppressed, and the power element 23 may be charged at −50 kW with the output of the power converter 11A set to 5 KW, the output of the power converter 11B set to 15 KW, and the output of the power converter 11C set to 30 kW. In optimizing the line DL12*a*, the line DL12*b*, and the line DL12*c*, the control unit 41 may change the inclination of the reference function to set the output from the power converter 11A to 5 kW, set the output from the power converter 11B to 15 kW, and set the output from the power converter 11C to 30 kW.

Figure 14:
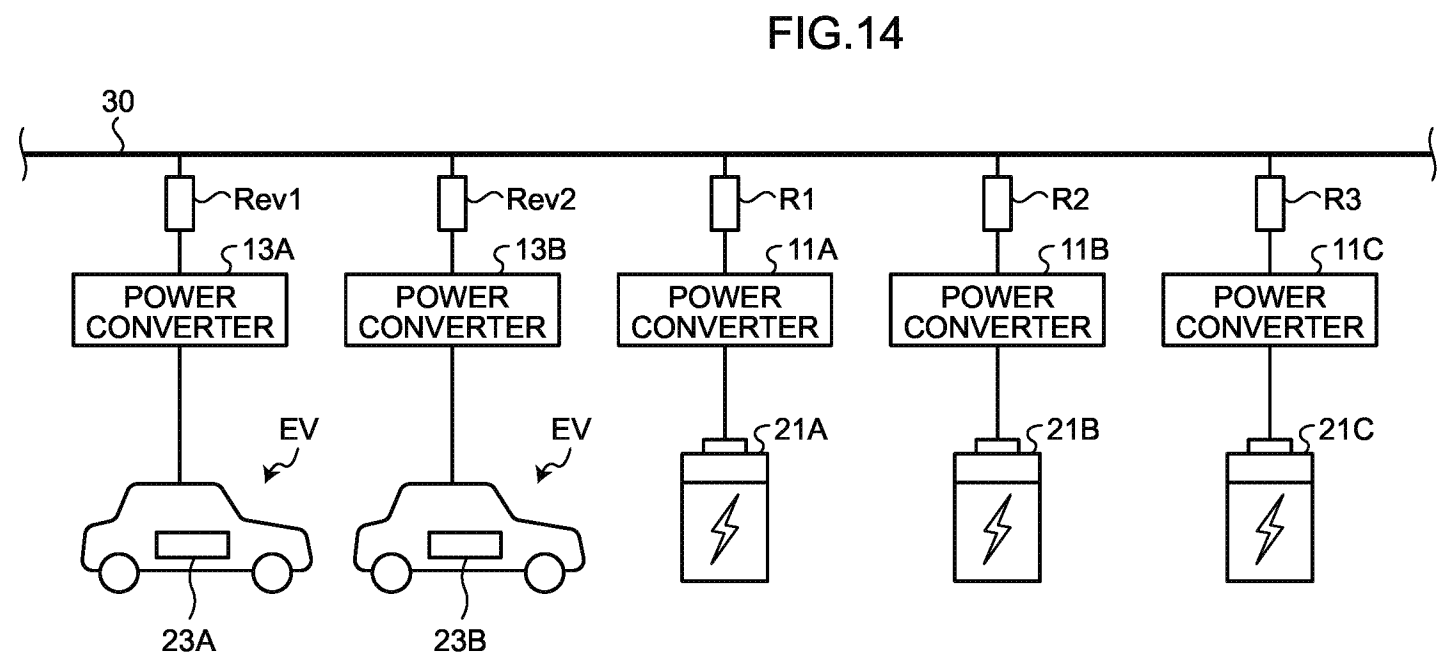

Next, the third example of the optimization of the reference function described above will be described. FIG. 14 is a diagram illustrating a power element and a power converter included in the third example. In the third example, the same components as those of the above-described examples are denoted by the same reference numerals, and the description thereof will be omitted. In the third example, the power elements 21A, 21B, and 21C, the power elements 23A and 23B, the power converters 11A, 11B, and 11C, and the power converters 13A and 13B are included in the power system 1. Each of the power converters 13A and 13B is the same power converter as the power converter 13. Also, each of the power elements 23A and 23B is the same power element as the power element 23. The power converter 13A has a function of converting the voltage of the DC power supplied by the power element 23A and outputting the converted voltage to the bus 30, and converting the voltage of the DC power supplied from the bus 30 and outputting the converted voltage to the power element 23A to charge the power element 23A. The power converter 13B has a function of converting the voltage of the DC power supplied by the power element 23B and outputting the converted voltage to the bus 30, and converting the voltage of the DC power supplied from the bus 30 and outputting the converted voltage to the power element 23B to charge the power element 23B.

In the third example, the line impedance of the power converter 13A is Rev1, the line impedance of the power converter 13B is Rev2, the line impedance of the power converter 11A is R1, the line impedance of the power converter 11B is R2, the line impedance of the power converter 11C is R3, and Rev1=Rev2=R1=R2=R3.

Figure 15A:
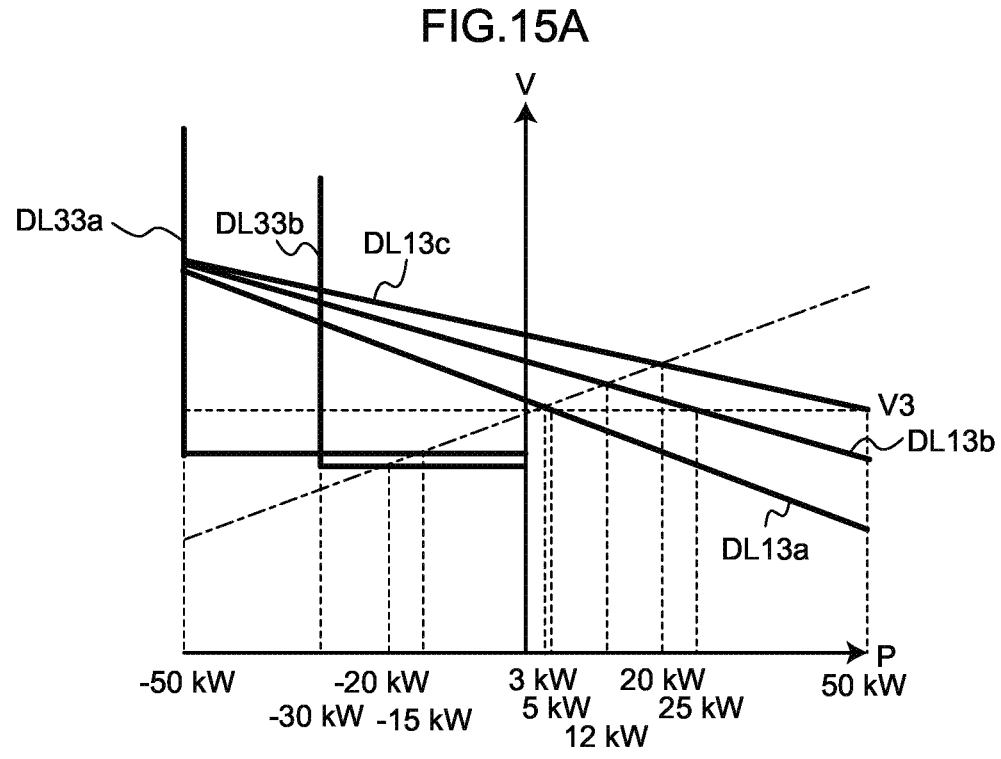
FIG. 15A is a diagram illustrating an example of the reference function.

FIG. 15A is a diagram illustrating an example of the reference function set in step S202 in the third example. For example, when charging the power elements 23A and 23B with the power supply from the power elements 21A, 21B, and 21C, the control unit 41 sets the shape of the reference function of the power converter 11A to the shape of the line DL13a illustrated in FIG. 15A, sets the shape of the reference function of the power converter 11B to the shape of the line DL13b illustrated in FIG. 15A, and sets the shape of the reference function of the power converter 11C to the shape of the line DL13c illustrated in FIG. 15A. In addition, the control unit 41 sets the shape of the reference function of the power converter 13A to the shape of the line DL33a illustrated in FIG. 15A, and sets the shape of the reference function of the power converter 13B to the shape of the line DL33b illustrated in FIG. 15A.

In a case where no voltage drop occurs in the bus 30, for example, when the local voltage is V3 illustrated in FIG. 15A in each power converter, the power converter 11A supplies power to the bus 30 at 5 kW which is the power target value when the local voltage is V3 on the line DL13a, the power converter 11B supplies power to the bus 30 at 25 kW which is the power target value when the local voltage is V3 on the line DL13b, and the power converter 11C supplies power to the bus 30 at 50 KW which is the power target value when the local voltage is V3 on the line DL13c. In addition, the power converter 13A charges the power element 23A at −50 kW, which is the power target value when the local voltage is V3, on the line DL33a, and the power converter 13B charges the power element 23B at −30 KW, which is the power target value when the local voltage is V3, on the line DL33b.

However, when a voltage drop occurs between the power converters 11A, 11B, and 11C and the power converters 13A and 13B by the alternate long and short dash line illustrated in FIG. 15A, the power converter 13A performs power control of charging so as to have a power value at the intersection of the alternate long and short dash line and the line DL33a, and charges the power element 23A at −15 kW, and the power converter 13B performs power control of charging so as to have a power value at the intersection of the alternate long and short dash line and the line DL33b, and charges the power element 23B at −20 kW. In addition, the power converter 11A performs power control so as to have a power value at the intersection of the alternate long and short dash line and the line DL13a, and suppresses the output to the bus 30 to 3 kW, the power converter 11B performs power control so as to have a power value at the intersection of the alternate long and short dash line and the line DL13b, and suppresses the output to the bus 30 to 12 kW, and the power converter 11C performs power control so as to have a power value at the intersection of the alternate long and short dash line and the line DL13c, and suppresses the output to the bus 30 to 20 kW.

Figure 15B:
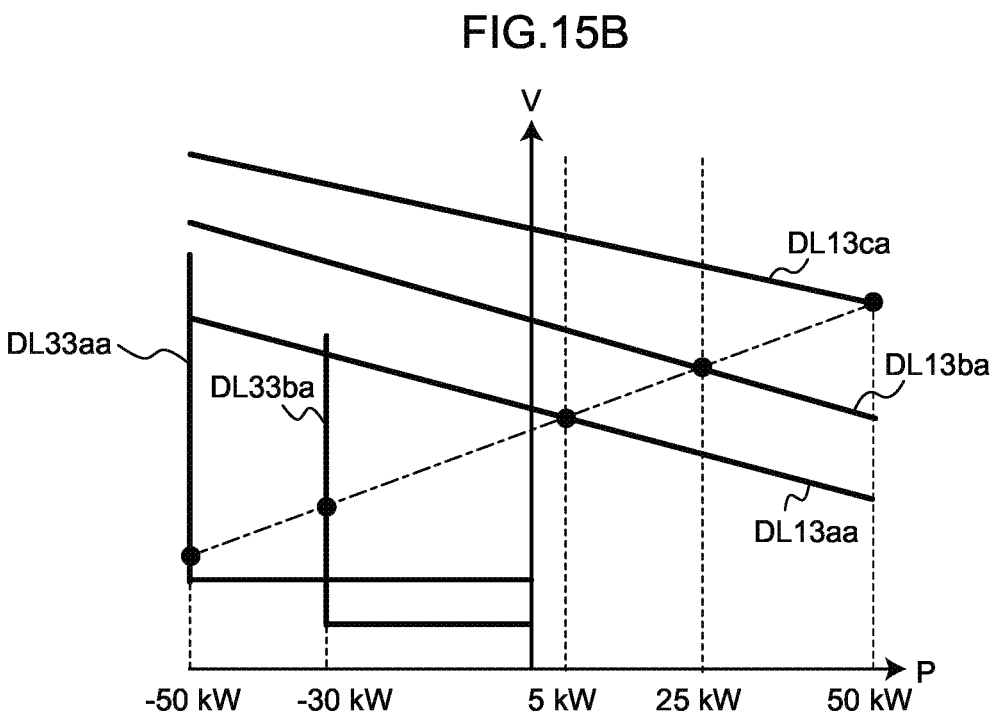
FIG. 15B is a diagram illustrating an example of the reference function.

Therefore, the control unit 41 optimizes the line DL13a, the line DL13b, and the line DL13c in step S204 described above. Specifically, for example, the control unit 41 changes the intercept information about the line DL13a and shifts the line upward to obtain the line DL13aa illustrated in FIG. 13B, changes the intercept information about the line DL13b and shifts the line upward to obtain the line DL13ba illustrated in FIG. 13B, and changes the intercept information about the line DL13c and shifts the line upward to obtain the line DL13ca illustrated in FIG. 13B. In addition, the control unit 41 changes the intercept information about the line DL33a and shifts the line downward to obtain the line DL33aa illustrated in FIG. 15B, and changes the intercept information about the line DL33b and shifts the line downward to obtain the line DL33ba illustrated in FIG. 15B.

As a result, even when a voltage drop occurs in the bus 30, the power interchange is not suppressed, and the output of the power converter 11A may be set to 5 kW, the output of the power converter 11B may be set to 25 kW, the output of the power converter 11C may be set to 50 kW, the power element 23A may be charged at −50 kW, and the power element 23B may be charged at −30 kw. In optimizing the line DL13a, the line DL13b, and the line DL13c, the control unit 41 may change the inclination to set the output from the power converter 11A to 5 kW, to set the output from the power converter 11B is 25 kW, and to set the output from the power converter 11C is 50 kW.

Figure 16:
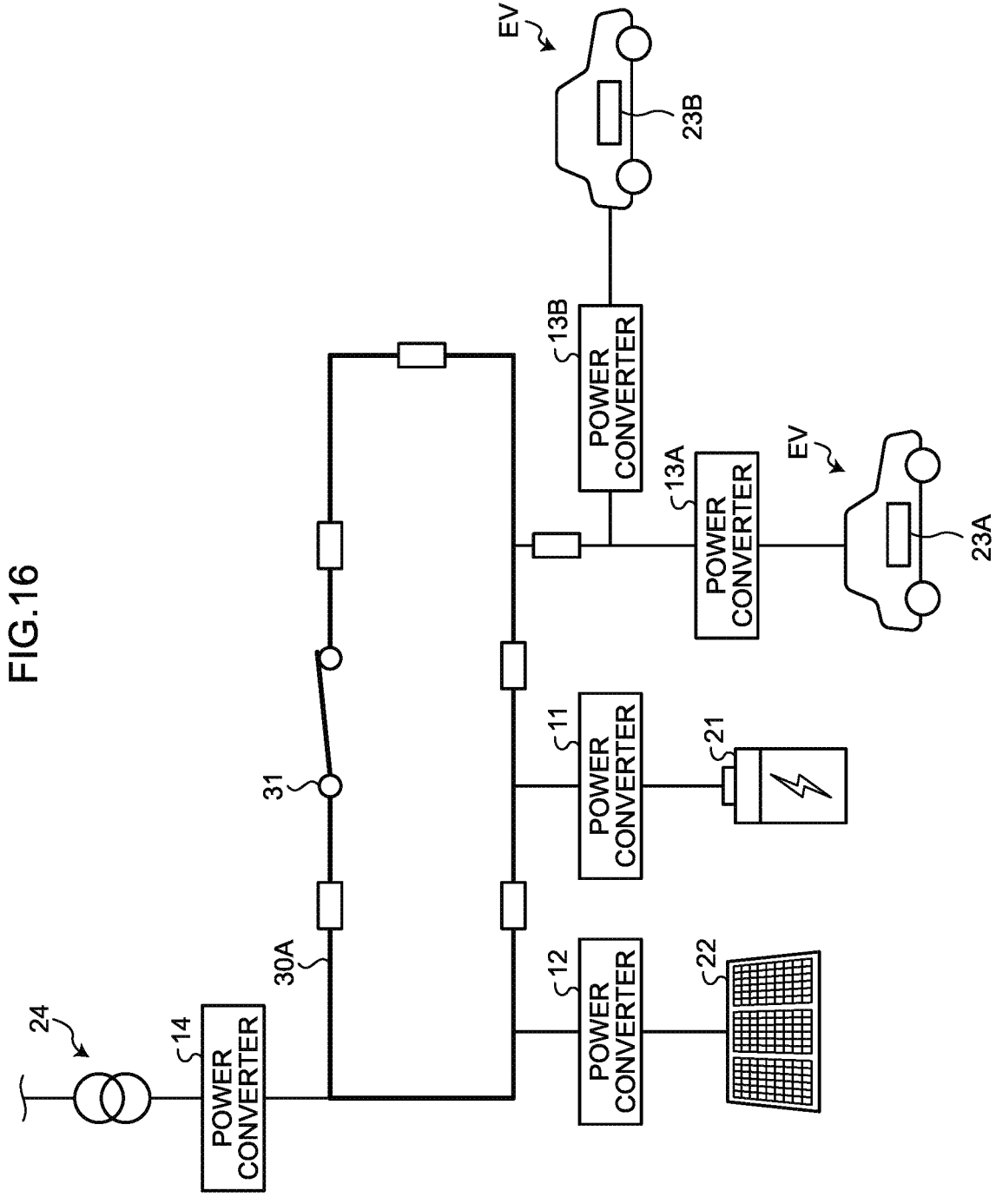
FIG. 16 is a diagram illustrating a power element and a power converter included in the fourth example.

Next, the fourth example of the optimization of the reference function described above will be described. FIG. 16 is a diagram illustrating a power element and a power converter included in fourth example. In the fourth example, the same components as those of the embodiment or the above-described example are denoted by the same reference numerals, and description thereof is omitted. In the fourth example, the bus 30A, a switch 31, the power element 21, the power element 22, the power elements 23A and 23B, the power element 24, the power converters 11, 12, 13A and 13B, and the power converter 14 are included in the power system 1.

In the fourth example, the power system 1 includes a bus 30A instead of the bus 30. The bus 30A is a bus whose wiring topology is a ring type. The switch 31 is a device that opens and closes an electric path of the ring-shaped bus 30A. In the fourth example, the switch 31 is in a closed state. In addition, in the fourth example, the bus side of the power converter 13A and the bus side of the power converter 13B are connected before being connected to the bus 30A.

Figure 17A:
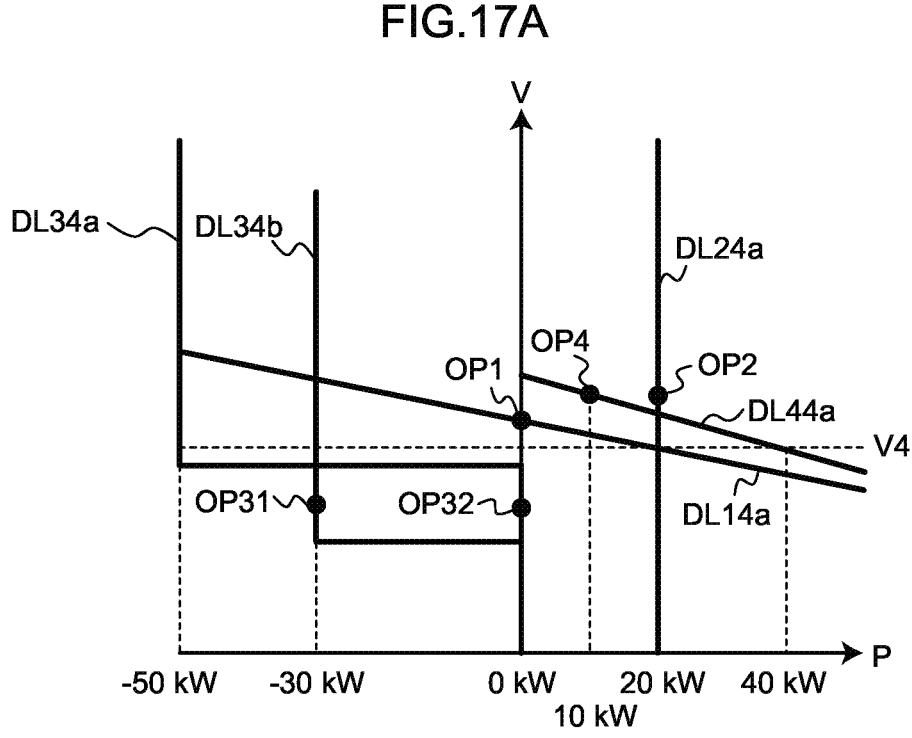
FIG. 17A is a diagram illustrating an example of the reference function.

FIG. 17A is an example of a reference function set in step S202 in the fourth example. For example, in a case where charging the power elements 23A and 23B with the power supply from the power elements 21, 22, and 24, the control unit 41 sets the shape of the reference function of the power converter 11 to the shape of the line DL14a illustrated in FIG. 17A, sets the shape of the reference function of the power converter 12 to the shape of the line DL24a illustrated in FIG. 17A, and sets the shape of the reference function of the power converter 14 to the shape of the line DL44a illustrated in FIG. 17A. In addition, the control unit 41 sets the shape of the reference function of the power converter 13A to the shape of the line DL34a illustrated in FIG. 17A, and sets the shape of the reference function of the power converter 13B to the shape of the line DL34b illustrated in FIG. 17A.

In a case where no voltage drop occurs in the bus 30A, for example, when the local voltage is V4 illustrated in FIG. 17A in each power converter, the power converter 11 supplies power to the bus 30 at 20 kW which is the power target value when the local voltage is V4 on the line DL14a, the power converter 12 supplies power to the bus 30 at 20 kW which is the power target value when the local voltage is V4 on the line DL24a, and the power converter 14 supplies power to the bus 30 at 40 KW which is the power target value when the local voltage is V4 on the line DL44a. In addition, the power converter 13A charges the power element 23A at −50 KW, which is the power target value when the local voltage is V4 on the line DL34a, and the power converter 13B charges the power element 23B at −30 kW, which is the power target value when the local voltage is V4 on the line DL34b.

However, in a case where there is a voltage drop on the bus 30A, in the figure, when the operating point of the power converter 11 is OP1, the operating point of the power converter 12 is OP2, the operating point of the power converter 13A is OP31, the operating point of the power converter 13B is OP32, and the operating point of the power converter 14 is OP4, the positions of the respective operating points are the positions illustrated in FIG. 17A. When the location of each operating point is the location illustrated in FIG. 17A, the power converter 13A does not charge power element 23A and the power converter 13B charges the power element 23B at −30 kW. When the position of each operating point is the position illustrated in FIG. 17A, the power converter 11 sets the output to the bus 30A to 0 kW, the power converter 12 sets the output to the bus 30A to 20 kW, and the power converter 14 suppresses the output to the bus 30A to 10 kW.

Therefore, the control unit 41 optimizes the line DL14a and the line DL44a in step S204 described above. Specifically, for example, the control unit 41 changes the intercept information about the line DL14a and shifts the line upward to obtain the line DL14aa illustrated in FIG. 17B, and changes the intercept information about the line DL44a and shifts the line upward to obtain the line DL44aa illustrated in FIG. 17B. In addition, the control unit 41 changes the intercept information about the line DL34a and shifts the line downward to obtain the line DL34aa illustrated in FIG. 17B, and changes the intercept information about the line DL34b and shifts the line downward to obtain the line DL34ba illustrated in FIG. 17B.

As a result, even when a voltage difference occurs due to a voltage drop in the bus 30A, the power interchange is not suppressed, and the output of the power converter 11 may be set to 20 kW, the output of the power converter 12 may be set to 20 kW, the output of the power converter 14 may be set to 40 kW, the power element 23A may be charged at −50 kW, and the power element 23B may be charged at −30 kw. In optimizing the line DL14a and the line DL44a, the control unit 41 may change the inclination to set the output from the power converter 11 to 20 kW and the output from the power converter 14 to 40 kW.

Figure 18:
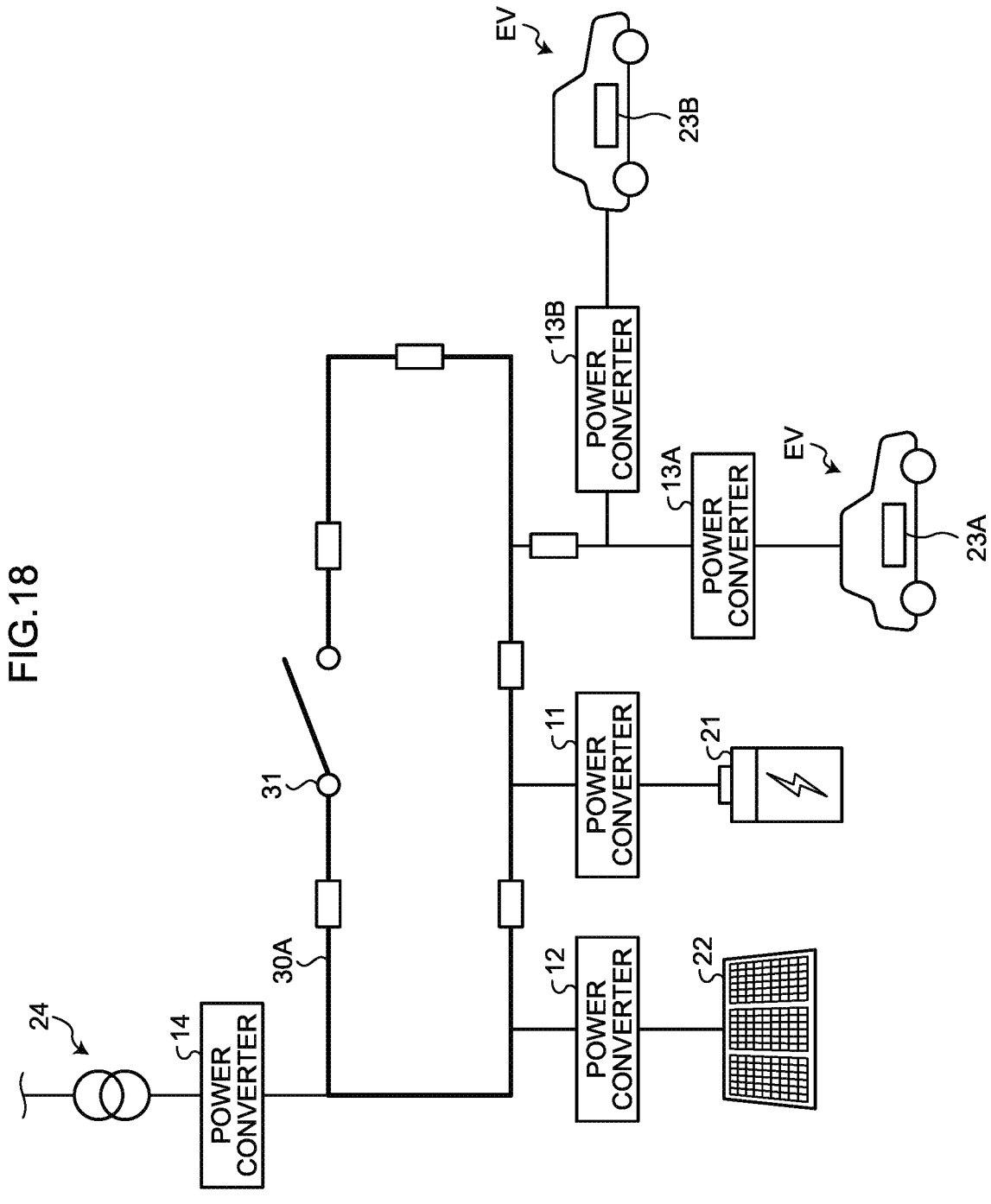
FIG. 18 is a diagram illustrating a power element and a power converter included in the fifth example.

Next, the fifth example of the optimization of the reference function described above will be described. FIG. 18 is a diagram illustrating a power element and a power converter included in the fifth example. In the fifth example, the same components as those in the embodiment or the above-described examples are denoted by the same reference numerals, and description thereof is omitted. The fifth example is different from the fourth example in that the switch 31 is in the open state.

Figure 17B:
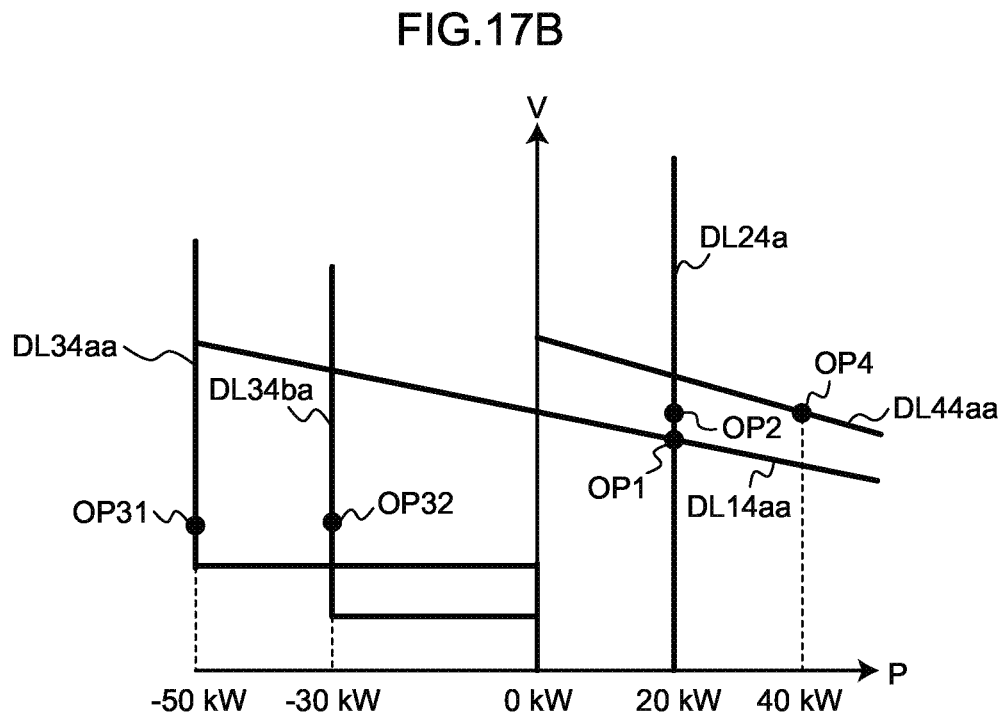
FIG. 17B is a diagram illustrating an example of the reference function.

When the switch 31 is in the closed state, the reference functions of the power converters 11, 12, 13A, 13B, and 14 are as illustrated in FIG. 17B. When the switch 31 is changed from the closed state to the open state, the line impedance of the bus 30A changes due to the change in the wiring topology from the ring type to the bus type, and the voltage drop between the power converters increases. For example, the power converter 14 and the power converters 13A and 13B are connected in parallel when the switch 31 is in the closed state, but are connected in series when the switch 31 is in the open state, and the configuration of the bus 30A changes and the line impedance increases, so that the voltage drop increases.

Figure 19A:
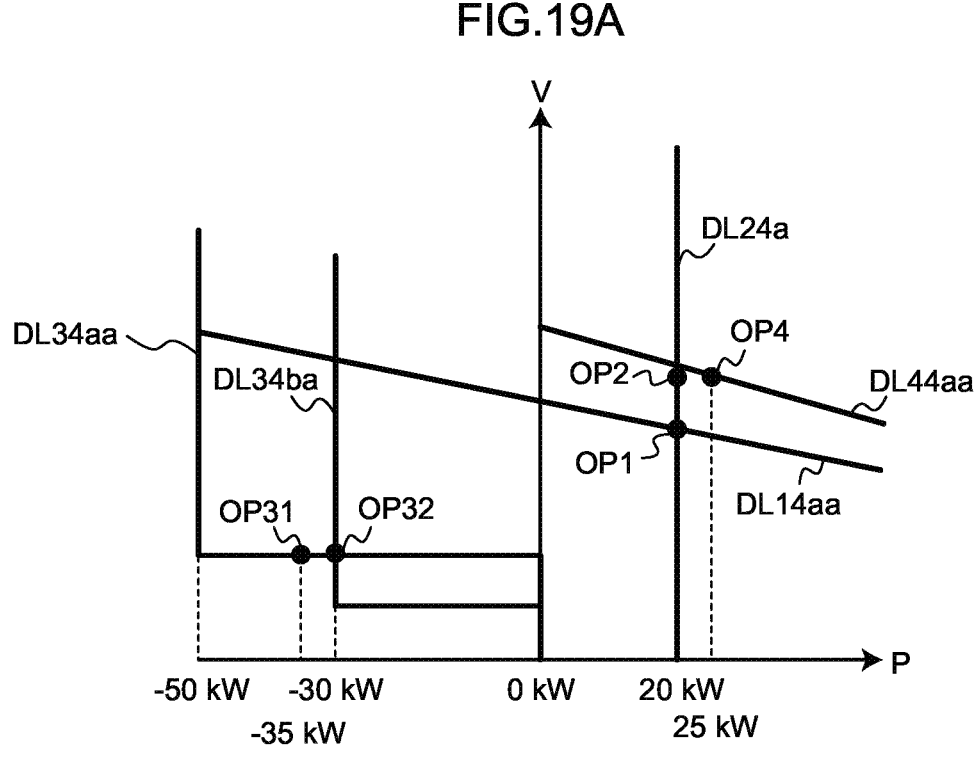
FIG. 19A is a diagram illustrating an example of the reference function.

As a result, the position of the operating point of each of the power converters 11, 12, 13A, 13B, and 14 is the position illustrated in FIG. 19A, and as illustrated in FIG. 19A, the power converter 11 supplies power to the bus 30A at 20 kW, the power converter 12 supplies power to the bus 30A at 20 kW from the power element 22, and the power converter 14 supplies power to the bus 30A at 25 kW from the power element 24. In addition, the power converter 13A charges the power element 23A at −35 kW, and the power converter 13B charges the power element 23B at −30 kW, which makes it difficult to perform target power interchange.

Figure 19B:
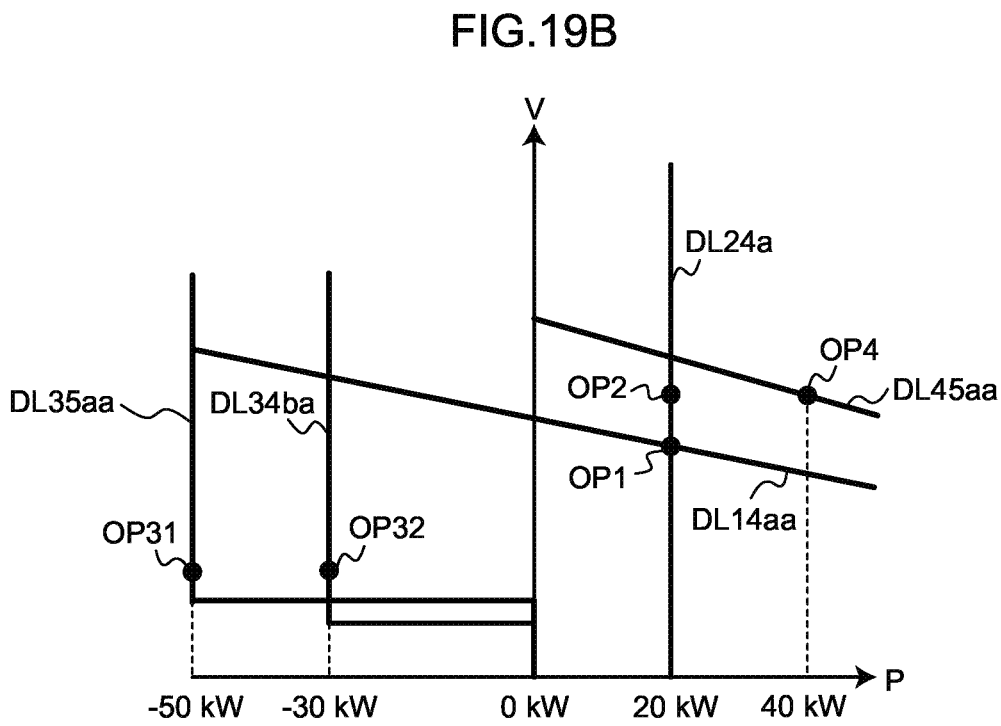
FIG. 19B is a diagram illustrating an example of the reference function.

Therefore, when the data indicating the wiring topology stored in the storage unit 42 is changed by the state change of the switch 31, the control unit 41 executes the processing illustrated in FIGS. 7 and 8 and optimizes the reference function of each power converter. Specifically, the control unit 41 changes the intercept information about the line DL44aa and shifts the line upward to obtain the line DL45aa illustrated in FIG. 19B. The control unit 41 changes the intercept information about the line DL34aa and shifts the line downward to obtain the line DL35aa illustrated in FIG. 19B.

As a result, even when a voltage difference occurs due to a voltage drop in the bus 30A, the power interchange is not suppressed, and the output from the power converter 11 may be set to 20 kW, the output from the power converter 12 may be set to 20 kW, the output from the power converter 14 may be set to 40 kW, the power element 23A may be charged at −50 kW, and the power element 23B may be charged at −30 kw. In optimizing the line DL44aa, the control unit 41 may change the inclination to set the output from the power converter 14 to 40 kW.

Next, the sixth example of the optimization of the reference function described above will be described. The sixth example is an example of a case where the output of the power element 22 decreases when each power converter is operating with the reference function illustrated in FIG. 17B in the fourth example.

Figure 20A:
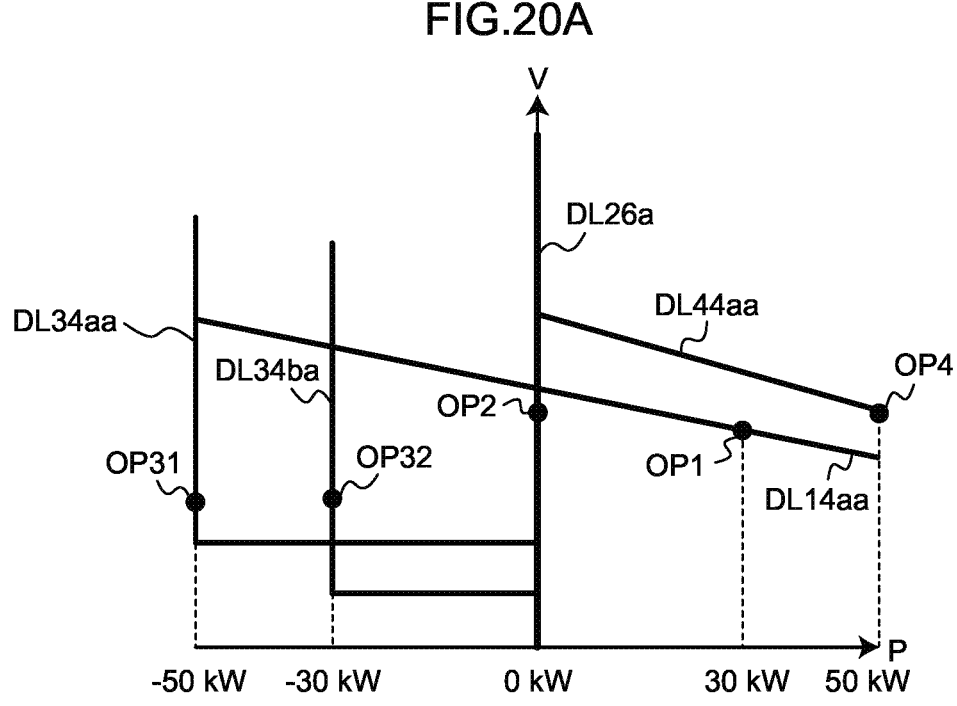
FIG. 20A is a diagram illustrating an example of the reference function.

For example, when the output of the power element 22 is 0 kW, the reference function of the power converter 12 is updated to the line DL26a illustrated in FIG. 20A. In addition, when the output of the power element 22 is 0 kW, the voltage drop decreases between the power converter 14 and the power converters 13A and 13B. When the voltage drop between the power converters decreases, the positions of the operating points of the power converters 11, 12, 13A, 13B, and 14 are the positions illustrated in FIG. 20A. Here, in the power converters 11 and 14, the local voltage decreases, and as illustrated in FIG. 20A, the power converter 11 supplies power to the bus 30A at 30 kW, and the power converter 14 supplies power to the bus 30A at 50 kW. In addition, the power converter 13A charges the power element 23A at −50 kW, and the power converter 13B charges the power element 23B at −30 kW, so that the power supply from the power element 24, which is a commercial electric power system, increases.

Figure 20B:
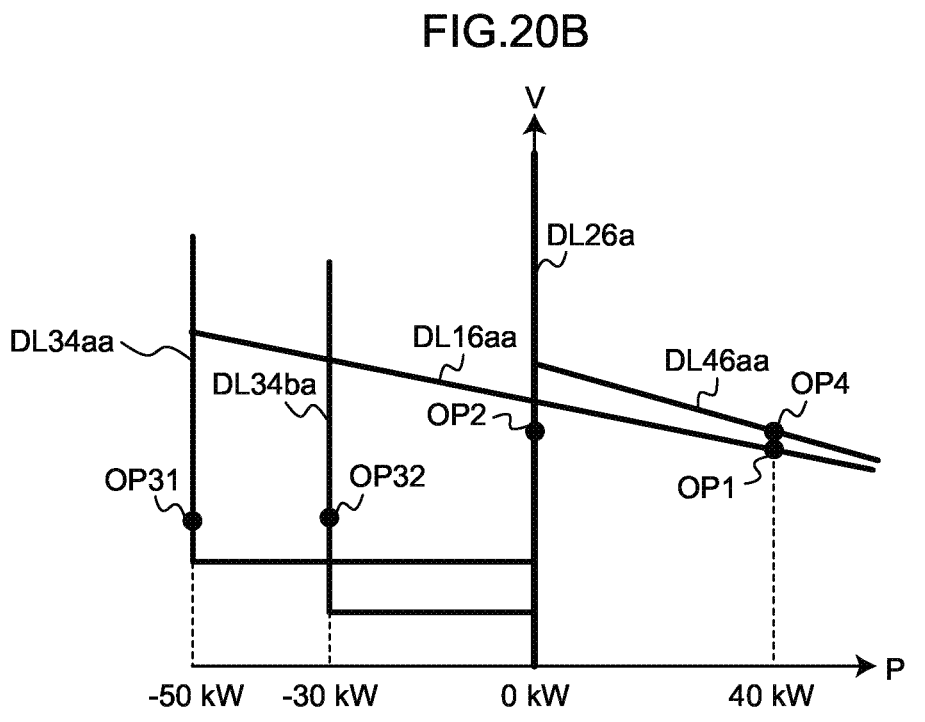
FIG. 20B is a diagram illustrating an example of the reference function.

Therefore, when the output of the power element 22 decreases, the control unit 41 optimizes the reference function of each power converter. Specifically, the control unit 41 changes the intercept information about the line DL44aa and shifts the line downward to obtain the line DL46aa illustrated in FIG. 20B. The control unit 41 changes the intercept information about the line DL14*aa* and shifts the line upward to obtain the line DL16*aa* illustrated in FIG. 20B. As a result, even when a voltage difference occurs between the power converters 11 and 14 and the power converters 13A and 13B due to a voltage drop, the power supply from the power element 24 may be suppressed, the output of the power converter 11 may be set to 40 kW, the output from the power converter 14 may be suppressed to 40 kW, the power element 23A may be charged at −50 kW, and the power element 23B may be charged at −30 kw. In optimizing the line DL14*aa* and the line DL44*aa*, the control unit 41 may change the inclination to set the output from the power converter 11 to 40 kW and to set the output from the power converter 14 to 40 kW.

Figure 21:
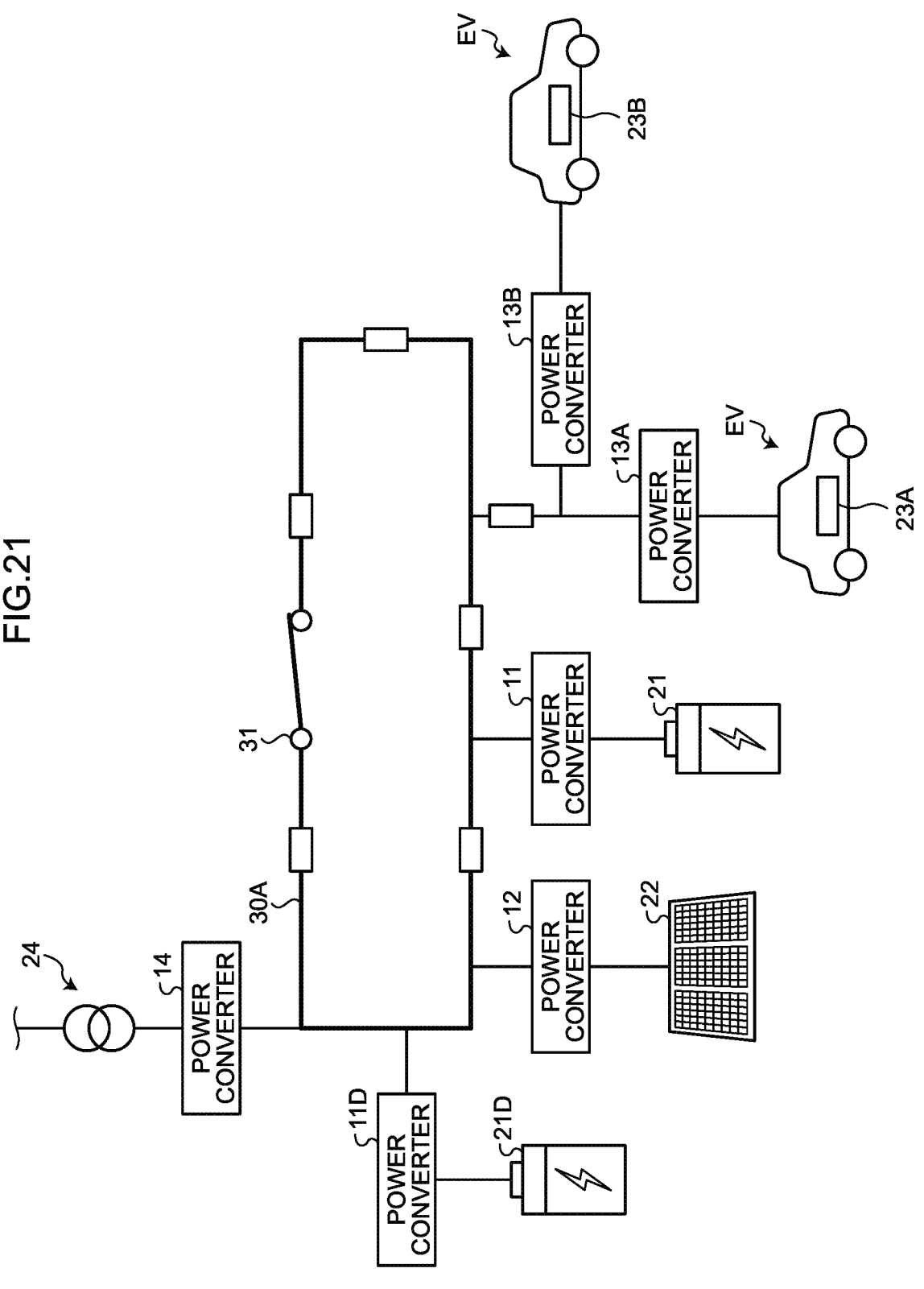
FIG. 21 is a diagram illustrating a power element and a power converter included in the seventh example.

Next, the seventh example of the optimization of the reference function described above will be described. FIG. 21 is a diagram illustrating a power element and a power converter included in the seventh example. Note that the same components as those in the embodiment or the above-described examples are denoted by the same reference numerals, and description thereof is omitted. The seventh example is an example in which a power converter 11D and a power element 21D are added to the fourth example. The power element 21D is the same stationary electrical storage device as the power element 21, and the power converter 11D is the same power converter as the power converter 11.

Figure 22A:
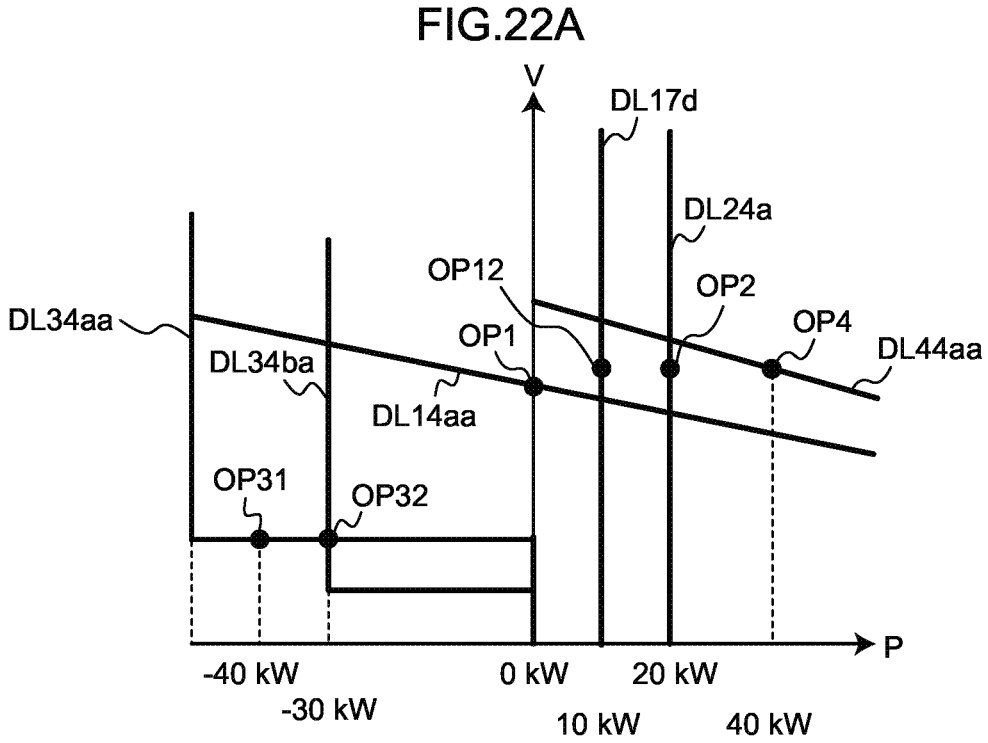
FIG. 22A is a diagram illustrating an example of the reference function.

From the state illustrated in FIG. 16, when the power converter 11D to which the power element 21D is connected is connected to the bus 30A at the position illustrated in FIG. 21, for the reference function of each power converter before being updated by the central control is, as illustrated in FIG. 22A, the reference function of the power converter 11 is the line DL14*aa*, the reference function of the power converter 12 is the line DL24*a*, the reference function of the power converter 13A is the line DL34*aa*, the reference function of the power converter 13B is the line DL34*ba*, the reference function of the power converter 14 is the line DL24*a*, and the reference function of the power converter 11D is the line DL17*d*.

When the power element 21D and the power converter 11D are added to the power system 1, the power supplied to the bus 30A increases. Therefore, in the bus 30A, the voltage drop between the power converters increases, and the positions of the operating points of the power converters 11, 11D, 12, 13A, 13B, and 14 are the positions illustrated in FIG. 22A. In the figure, the operating point of the power converter 11D is OP12.

Here, in the power converters 11, 11D, 12, and 14, the local voltage increases, and as illustrated in FIG. 22A, the output of the power converter 11 is 0 kw, the power converter 11D supplies power to the bus 30A at 10 kW, the power converter 12 supplies power to the bus 30A at 20 kW, and the power converter 14 supplies power to the bus 30 at 40 kW. In addition, the power converter 13A charges the power element 23A at −40 kW, and the power converter 13B charges the power element 23B at −30 kW, so that the charging power is suppressed.

Figure 22B:
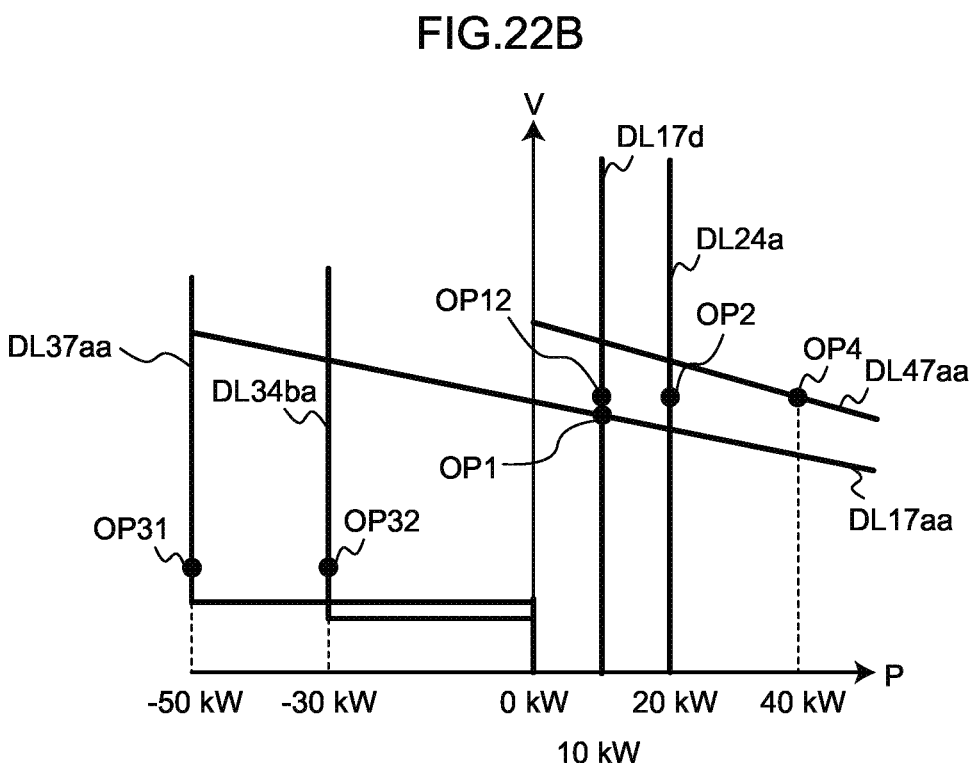
FIG. 22B is a diagram illustrating an example of the reference function.

Therefore, when the power element 21D and the power converter 11D are added to the power system 1, the control unit 41 optimizes the reference function of each power converter. Specifically, the control unit 41 changes the intercept information about the line DL44*aa* and shifts the line upward to obtain the line DL47*aa* illustrated in FIG. 22B. The control unit 41 changes the intercept information about the line DL14*aa* and shifts the line upward to obtain the line DL17*aa* illustrated in FIG. 22B. In addition, the control unit 41 changes the intercept information about the line DL34*aa* and shifts the line downward to obtain the line DL37*aa* illustrated in FIG. 22B.

As a result, even when a voltage difference occurs due to a voltage drop in the bus 30A, the power interchange is not suppressed, and the output of the power converter 11 may be set to 10 kW, the output of the power converter 14 may be set to 40 kW, the power element 23A may be charged at −50 kW, and the power element 23B may be charged at −30 kw. In optimizing the line DL14*aa* and the line DL44*aa*, the control unit 41 may change the inclination to set the output from the power converter 11 to 10 kW and to set the output from the power converter 14 to 40 kW.

Although the embodiments have been described above, the present disclosure is not limited to the above-described embodiments, and may be implemented in various other forms. For example, the present disclosure may be implemented by modifying the above-described embodiments as follows. Note that the above-described embodiments and the following modifications may be combined. The present disclosure also includes components configured by appropriately combining the components of the above-described embodiments and modifications. Further, further effects and modifications may be easily derived by those skilled in the art. Therefore, a wider aspect of the present disclosure is not limited to the above embodiments and modifications, and various modifications may be made.

In the above-described embodiments, for example, even when the demand for power in the power element 23 decreases, the EMS 40 may update the reference function.

In the above-described embodiments, a power converter to which a power element that consumes power is connected may be connected to the bus 30 or the bus 30A. The power element that consumes power is, for example, a device that converts power into kinetic energy or thermal energy.

In the present disclosure, the EMS 40 may transmit the update command only to the power converter that updates the reference function. In this case, the EMS 40 may notify the power converter that does not update the reference function that the reference function is not updated.

According to the present disclosure, it is possible to perform power interchange of a target power value even when a voltage drop occurs between the power supply side and the demand side.

The present disclosure may be used for a power system, a controller, and a control method.

What is claimed is:

1. A power system comprising:
   a plurality of power converters each including
      a power conversion unit configured to convert input power and output the converted power,
      a measurement unit configured to acquire an electrical characteristic value of the input power or the output power,
      a storage unit configured to store a reference function in which an electrical characteristic value of an output of the power conversion unit is defined according to an input value,
      a characteristic control unit configured to control a power conversion characteristic of the output of the power conversion unit based on the reference function by using the electrical characteristic value acquired by the measurement unit as the input value, and
      an update unit configured to acquire a reference function and update the reference function stored in the storage unit to the acquired reference function;

a controller including
a reference function setting unit configured to set the
reference function of each of the plurality of power
converters, and
an output unit configured to output the set reference
function to the plurality of power converters; and
a DC electric line to which the plurality of power con-
verters are connected, wherein
the reference function setting unit is configured to
calculate, for each of the plurality of power converters,
a voltage drop in the electric line from a power target
value of the output of the power conversion unit and
a line impedance of the electric line,
calculate a voltage target value of a local voltage of the
power converter when the power target value is
output within an operating voltage range of the
power converter based on the calculated voltage
drop, and
set the reference function to a reference function in
which an electrical characteristic value of the output
of the power conversion unit when a local voltage is
the voltage target value is defined as the power target
value.
2. The power system according to claim 1, wherein
the reference function setting unit is configured to, in a
case where the line impedance changes due to a change
in a configuration of the electric line, calculate a
voltage drop in the electric line from a power target
value of the output of the power conversion unit and the
changed line impedance, calculate a voltage target
value of a local voltage of the power converter when
the power target value is output within an operating
voltage range of the power converter based on the
calculated voltage drop, and update the reference func-
tion to a reference function in which an electrical
characteristic value of the output of the power conver-
sion unit when a local voltage is the voltage target value
is defined as the power target value, and
the output unit is configured to output the updated refer-
ence function.
3. The power system according to claim 1, wherein the
reference function setting unit is configured to, when a
demand for power in a power element connected to the
power converter or a supply of power from the power
element changes, calculate a voltage drop in the electric line
from a power target value of the output of the power
conversion unit according to the change and a line imped-
ance of the electric line, calculate a voltage target value of
a local voltage of the power converter when the power target
value is output within an operating voltage range of the
power converter based on the calculated voltage drop, and
update the reference function to a reference function in
which an electrical characteristic value of the output of the
power conversion unit when a local voltage is the voltage
target value is defined as the power target value.
4. The power system according to claim 1, wherein
the reference function setting unit is configured to, in a
case where the number of the power converters con-
nected to the electric line increases or decreases, cal-
culate a voltage drop in the electric line from a power
target value of an output of the power conversion unit
of the power converter connected to the electric line
and a line impedance of the electric line after the
number increases or decreases, calculate a voltage
target value of a local voltage of the power converter
when the power target value is output within an oper-
ating voltage range of the power converter based on the calculated voltage drop, and update the reference func-
tion to a reference function in which an electrical
characteristic value of the output of the power conver-
sion unit when a local voltage is the voltage target value
is defined as the power target value.
5. The power system according to claim 1, wherein
the power target value is set based on a power supply and
demand in the plurality of power converters, a supply
and demand prediction of power in a power element
connected to the power converter, or an optimization
calculation of an output of the power converter.
6. The power system according to claim 1, wherein
the plurality of power converters includes a power con-
verter to which a power element capable of supplying
power and being charged and discharged is connected,
a power converter to which a power element that
supplies power is connected, and a power converter
that consumes power.
7. A controller comprising:
a reference function setting unit configured to set a
reference function of each of a plurality of power
converters, the plurality of power converters each
including a power conversion unit configured to con-
vert input power and output the converted power, a
measurement unit configured to acquire an electrical
characteristic value of the input power or the output
power, a storage unit configured to store a reference
function in which an electrical characteristic value of
an output of the power conversion unit is defined
according to an input value, a characteristic control unit
configured to control a power conversion characteristic
of the output of the power conversion unit based on the
reference function by using the electrical characteristic
value acquired by the measurement unit as the input
value, and an update unit configured to acquire a
reference function and update the reference function
stored in the storage unit to the acquired reference
function; and
an output unit configured to output the set reference
function to the plurality of power converters, wherein
the reference function setting unit is configured to
calculate, for each of the plurality of power converters,
a voltage drop in the electric line from a power target
value of the output of the power conversion unit and
a line impedance of a DC electric line to which the
plurality of power converters is connected,
calculate, based on the calculated voltage drop, a
voltage target value of a local voltage of the power
converter when the power target value is output
within an operating voltage range of the power
converter, and
set the reference function to a reference function in
which an electrical characteristic value of the output
of the power conversion unit when a local voltage is
the voltage target value is defined as the power target
value.
8. A control method comprising:
a reference function setting step of setting a reference
function of each of a plurality of power converters, the
plurality of power converters each including a power
conversion unit configured to convert input power and
output the converted power, a measurement unit con-
figured to acquire an electrical characteristic value of
the input power or the output power, a storage unit
configured to store a reference function in which an
electrical characteristic value of an output of the power
conversion unit is defined according to an input value, a characteristic control unit configured to control a power conversion characteristic of the output of the power conversion unit based on the reference function by using the electrical characteristic value acquired by the measurement unit as the input value, and an update unit configured to acquire a reference function and update the reference function stored in the storage unit to the acquired reference function; and an output step of outputting a set reference function to the plurality of power converters, wherein the reference function setting step includes calculating, for each of the plurality of power converters, a voltage drop in the electric line from a power target value of the output of the power conversion unit and a line impedance of a DC electric line to which the plurality of power converters is connected, calculating, based on the calculated voltage drop, a voltage target value of a local voltage of the power converter when the power target value is output within an operating voltage range of the power converter, and setting the reference function to a reference function in which an electrical characteristic value of the output of the power conversion unit when a local voltage is the voltage target value is defined as the power target value.

* * * * *